(12) United States Patent
Konuma et al.

(10) Patent No.: US 9,113,269 B2
(45) Date of Patent: Aug. 18, 2015

(54) AUDIO PROCESSING DEVICE, AUDIO PROCESSING METHOD, AUDIO PROCESSING PROGRAM AND AUDIO PROCESSING INTEGRATED CIRCUIT

(71) Applicant: Panasonic Intellectual Property Corporation of America, Torrance, CA (US)

(72) Inventors: Tomohiro Konuma, Osaka (JP); Tsutomu Uenoyama, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 169 days.

(21) Appl. No.: 13/981,708

(22) PCT Filed: Nov. 8, 2012

(86) PCT No.: PCT/JP2012/007156
§ 371 (c)(1),
(2) Date: Jul. 25, 2013

(87) PCT Pub. No.: WO2013/080449
PCT Pub. Date: Jun. 6, 2013

(65) Prior Publication Data
US 2014/0205102 A1   Jul. 24, 2014

(30) Foreign Application Priority Data
Dec. 2, 2011 (JP) .................................. 2011-264376

(51) Int. Cl.
| | | |
|---|---|---|
| H04R 29/00 | (2006.01) |
| G10L 25/81 | (2013.01) |
| G10L 25/57 | (2013.01) |
| G10L 15/10 | (2006.01) |
| G10L 25/24 | (2013.01) |

(52) U.S. Cl.
CPC .............. *H04R 29/008* (2013.01); *G10L 15/10* (2013.01); *G10L 25/24* (2013.01); *G10L 25/57* (2013.01); *G10L 25/81* (2013.01)

(58) Field of Classification Search
None
See application file for complete search history.

(56) References Cited

U.S. PATENT DOCUMENTS

| | | | |
|---|---|---|---|
| 2004/0167767 A1 | 8/2004 | Xiong et al. | |
| 2011/0246185 A1* | 10/2011 | Arakawa et al. | 704/200 |
| 2013/0035933 A1* | 2/2013 | Hirohata | 704/206 |

FOREIGN PATENT DOCUMENTS

| | | |
|---|---|---|
| JP | 10-247093 | 9/1998 |
| JP | 2004-258659 | 9/2004 |
| JP | 2007-4973 | 1/2007 |
| JP | 2012-70283 | 4/2012 |

OTHER PUBLICATIONS

International Search Report issued Feb. 26, 2013 in corresponding International Application No. PCT/JP2012/007156.

* cited by examiner

*Primary Examiner* — Paul Huber

(74) *Attorney, Agent, or Firm* — Wenderoth, Lind & Ponack, L.L.P.

(57) ABSTRACT

Provided is an audio processing device comprising: a feature data generation unit which generates, for each unit section of an audio signal, section feature data expressing features of the audio signal in the unit section; a feature variation calculation unit which calculates, for each unit section, a feature variation value quantifying temporal variation of the features in the unit section, by setting the unit section as a target section and using section feature data of unit sections close to the target section; and a section judgment unit which judges, for each unit section, whether the unit section is a feature unit section including a variation point of the features, based on comparison of a threshold value and the feature variation value. Through the above, the audio processing device can detect feature unit sections from an audio signal of an AV content or the like.

19 Claims, 24 Drawing Sheets

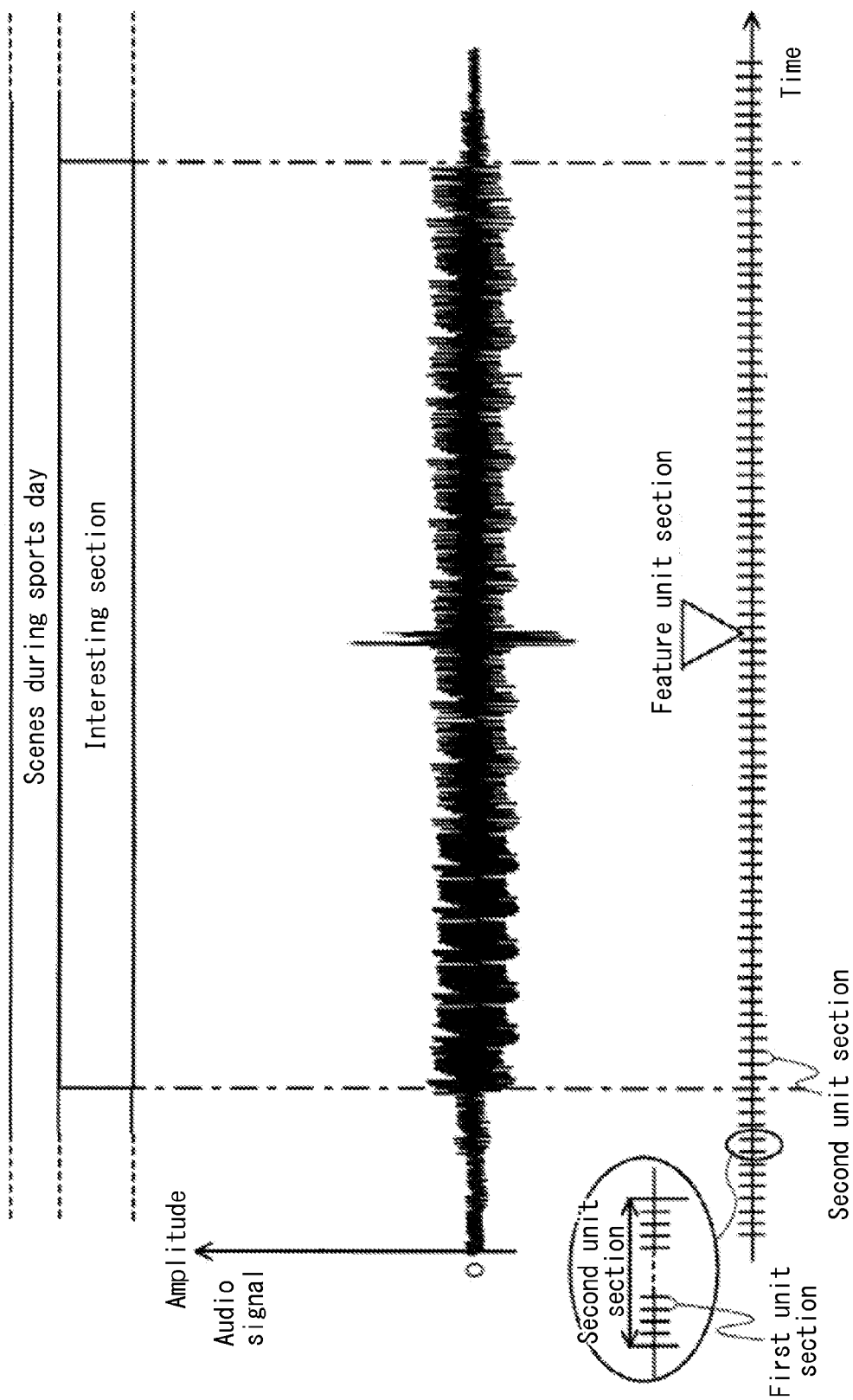

FIG. 3

| First unit section | Features ||||| |
|---|---|---|---|---|---|
| | M(1) | M(2) | M(2) | ... | M(26) |
| 0 - 10 ms | 0.450 | 0.505 | 0.288 | ... | 0.373 |
| 10 - 20 ms | 0.489 | 0.502 | 0.314 | ... | 0.419 |
| 20 - 30 ms | 0.530 | 0.527 | 0.287 | ... | 0.384 |
| ⋮ | ⋮ | ⋮ | ⋮ | ⋮ | ⋮ |
| 500 - 510 ms | 0.715 | 0.978 | 0.288 | ... | 0.141 |
| ⋮ | ⋮ | ⋮ | ⋮ | ⋮ | ⋮ |
| 990 - 1000 ms | - | - | - | ... | - |

| Anchor Model | Feature appearance probability function |
|---|---|
| A1 | bA1(M) |
| A2 | bA2(M) |
| A3 | bA3(M) |
| ⋮ | ⋮ |
| A1024 | bA1024(M) |

AUDIO PROCESSING DEVICE, AUDIO PROCESSING METHOD, AUDIO PROCESSING PROGRAM AND AUDIO PROCESSING INTEGRATED CIRCUIT

This is a U.S. National Stage under 35 U.S.C. 371 of the International Application PCT/JP2012/007156, filed Nov. 8, 2012.

TECHNICAL FIELD

The present invention relates to an art of detecting a section having specific features from an audio signal.

BACKGROUND ART

With regards to an AV content recorded by a user using a video recording device such as a digital camera, there is demand for a function for removing unnecessary sections from the AV content and extracting only sections which are of interest to the user (referred to below as interesting sections).

In one conventional art, a device is proposed which detects frequencies in a frequency band corresponding to human voices from an audio signal of an AV content, and extracts a section in which voices are continuous for at least a predetermined amount of time as an interesting section (refer to Patent Literature 1). The above device is able to extract the interesting section using a simple method of analyzing frequency of the audio signal and monitoring a continuation time.

In another conventional art, a method for extracting an interesting section is proposed in which probability models are used to determine for each unit section of an audio signal whether "applause", "cheering" or the like is included in the unit sections, and a section comprising of at least a predetermined number of consecutive unit sections which are determined to be of the same type are extracted as the interesting section (refer to Patent Literature 2).

In the methods disclosed in Patent Literature 1 and Patent Literature 2, the interesting section is detected by assessing continuity of audio features (features such as frequency of the audio signal).

CITATION LIST

Patent Literature

[Patent Literature 1] Japanese Patent Application Publication No. 2007-004973
[Patent Literature 2] Japanese Patent Application Publication No. 2004-258659

SUMMARY OF INVENTION

Technical Problem

A user may also desire a section including a sudden sound (for example a sound of a starter pistol for a footrace) as an interesting section. Unfortunately, interesting sections such as described above have identifying audio features which may not appear continuously. Therefore, the conventional arts described above which assess continuity of audio features may be unable to detect interesting sections such as the above.

The present invention has been conceived in light of the above problem and an aim thereof is to provide an audio processing device which is not dependent on continuity of audio features of an audio signal in order to detect therefrom a feature section including a sudden sound.

Solution to Problem

In order to solve the above problem, an audio processing device relating to the present invention comprises: a feature data generation unit configured to generate, for each unit section of an audio signal, section feature data expressing features of the audio signal in the unit section; a feature variation calculation unit configured to calculate, for each unit section of the audio signal, a feature variation value which quantifies temporal variation of the features of the audio signal in the unit section, by setting the unit section as a target section and using section feature data of a plurality of unit sections close to the target section; and a section judgment unit configured to judge, for each unit section of the audio signal, whether the unit section is a feature unit section including a variation point of the features of the audio signal, based on a result of comparison of a threshold value and the feature variation value of the unit section.

Advantageous Effects of Invention

According to the audio processing device relating to the present invention, temporal variation of features of the audio signal is quantified for each unit section, and the unit section is judged whether to be a unit section having a specific feature (feature unit section) by comparison of the threshold value and the quantified value. In other words, by assessing temporal variation of audio features, the audio processing device relating to the present invention is able to detect the feature section from the audio signal without depending on continuity of audio features.

BRIEF DESCRIPTION OF DRAWINGS

FIG. 1 illustrates an overview of feature unit section detection and interesting section extraction performed by an audio processing device.

FIG. 3 illustrates an example of the feature vectors.

FIG. 4 illustrates an example of Anchor Models.

DESCRIPTION OF EMBODIMENTS

Embodiment

1. Overview

Interesting sections which should be extracted from a video file may for example include a sudden action section during which a subject performs a sudden action and an action transition section during which a subject starts or ends an action which continues for a relatively long period of time. Features of an audio signal, such as a frequency characteristic, tend to exhibit sharp variation at a feature point such as the sudden action or action transition described above.

As a consequence of the above, preferably a section of the audio signal where features of the audio signal, such as the frequency characteristic, vary for a sudden short period of time (sudden action section) and a section which is a boundary for variation of features of the audio signal (action transition section) should each be detected as a feature unit section.

An audio processing device relating to an embodiment of the present invention first partitions an audio signal included in a video file into unit sections of predetermined length. The audio processing device calculates a feature amount for each of the unit sections, expressing features of the audio signal in the unit section. Next, based on temporal variation of the feature amount, the audio processing device automatically detects sections such as the sudden action section and the action transition section described above as feature unit sections. Subsequently, the audio processing device extracts as an interesting section, a section including the feature unit section and unit sections before and after the feature unit section having a similar feature amount thereto.

For example, the video file may be a video recorded of scenes from a sports day, and the audio signal may be expressed as a waveform illustrated in FIG. 1. Suppose that a user wishes to perform editing to cut out from the video file, a scene continuing for a predetermined amount of time before and after a start point of a footrace. The audio processing device relating to the present embodiment automatically detects as a feature unit section, a section in which features of the audio signal vary, for example due to a sound of a starter pistol at the start point of the footrace. Subsequently, the audio processing device extracts as an interesting section, a section including the feature unit section and unit sections before and after the feature unit section in which features of the audio signal are similar.

2. Data

The following describes data used by the audio processing device relating to the present embodiment.

<2-1. Video File>

Figure 2A:
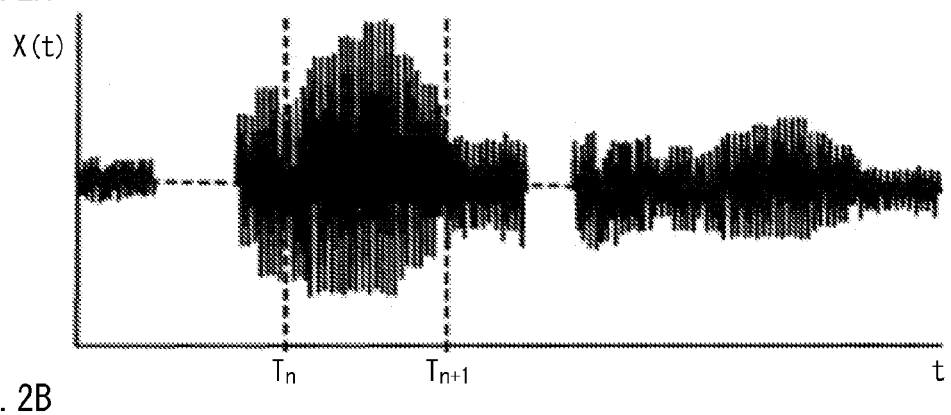
FIGS. 2A-2C illustrate a method for calculating feature vectors.

A video file is configured by an audio signal X(t) and a plurality of pieces of image data. The audio signal X(t) is time series data of amplitude values and can be represented by a waveform such as illustrated in FIG. 2A.

<2-2. Feature Vectors>

Feature vectors M express features of the audio signal X(t). In the present embodiment, the audio signal is partitioned into first unit sections and Mel-Frequency Cepstrum Coefficients (MFCC) for each of the first unit sections are used for the feature vectors M. Each first unit section is a section of a predetermined length (for example 10 msec) along a time axis of the audio signal X(t). For example, in FIG. 2A a section from a time $T_n$ to a time $T_{n+1}$ is one first unit section.

A feature vector M is calculated for each first unit section. Consequently, as illustrated in FIG. 3, 100 feature vectors M are generated for a section between a time of 0 sec and a time of 1 sec in the audio signal.

<2-3. Anchor Models>

Anchor Models $A_r$ (r=1, 2, ..., K) are probability models created using feature vectors generated from audio data including a plurality of sound pieces of various types. In the present embodiment a Gaussian Mixture Model (GMM) is adopted and each Anchor Model is configured by parameters defining a normal distribution.

As illustrated in FIG. 4, an Anchor Model is created for each of the sound pieces of various types (1024 types in the present embodiment). A feature amount appearance probability function $b_{Ar}$ is a probability density function of the normal distribution defined by each Anchor Model $A_r$, and through setting the feature vector M as an argument, a likelihood $L_r = b_{Ar}(M)$ is calculated for the audio signal X(t) with regards to each of the sound pieces.

<2-4. Likelihood Vectors>

A likelihood vector F is a vector having as components thereof, the likelihoods $L_r$ calculated for the audio signal X(t) with regards to the sound pieces of various types using the Anchor Models $A_r$ as described above.

Figure 5:
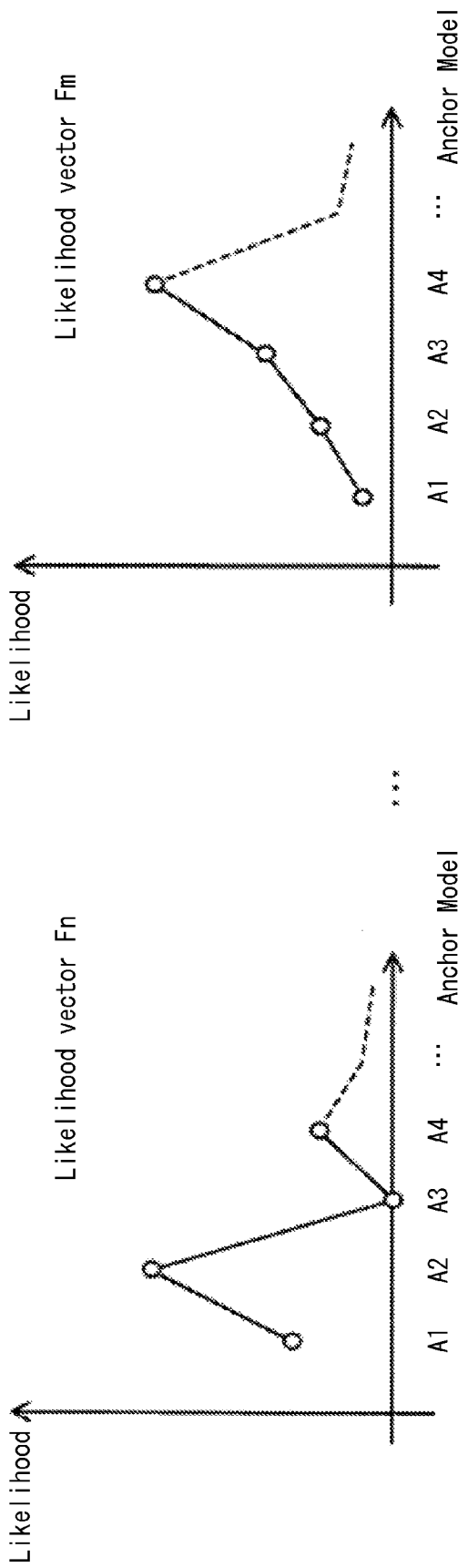
FIGS. 5A and 5B illustrate examples of likelihood vectors in two first unit sections.

FIGS. 5A and 5B illustrate likelihood vectors F in two different first unit sections. FIG. 5A illustrates a likelihood vector $F_n$ for an $n^{th}$ first unit section from time 0, in other words for a section between time 10(n) msec and time 10(n+1) msec. FIG. 5B shows a likelihood vector $F_m$ for an $m^{th}$ first unit section (n<m) from time 0, in other words for a section between time 10(m) msec and time 10(m+1) msec.

<2-5. Frequency Vectors>

Figure 6:
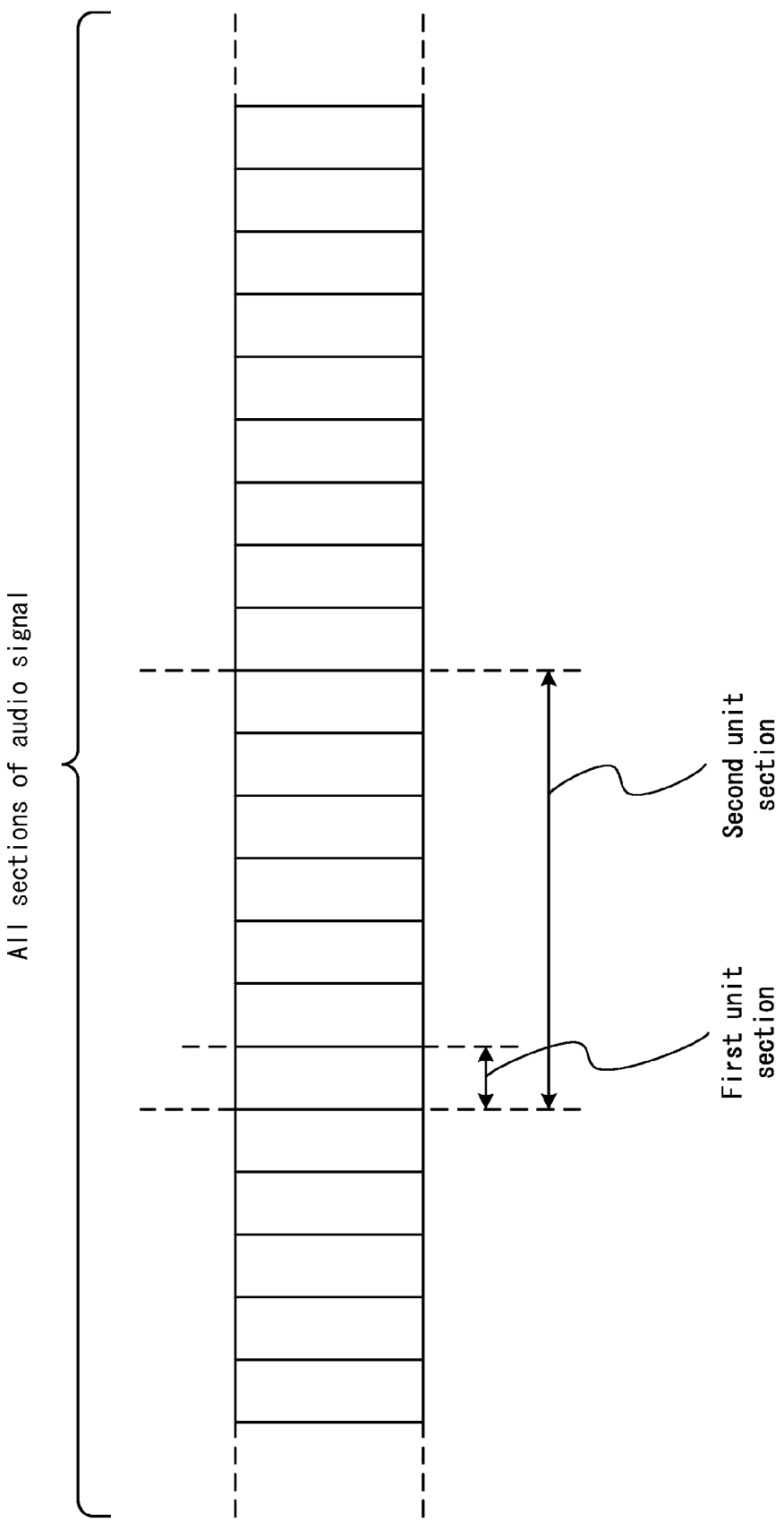
FIG. 6 illustrates a relationship between a first unit section and a second unit section.

Frequency vectors NF are vectors expressing features of the audio signal for each second unit section. Specifically, each of the frequency vectors NF is a vector which expresses an appearance frequency of each sound piece with regards to a second unit section of the audio signal. Each second unit section is a section of predetermined length (for example 1 sec) along the time axis of the audio signal X(t). As illustrated in FIG. 6, each second unit section is equivalent in length to a plurality of consecutive first unit sections.

Figure 7:
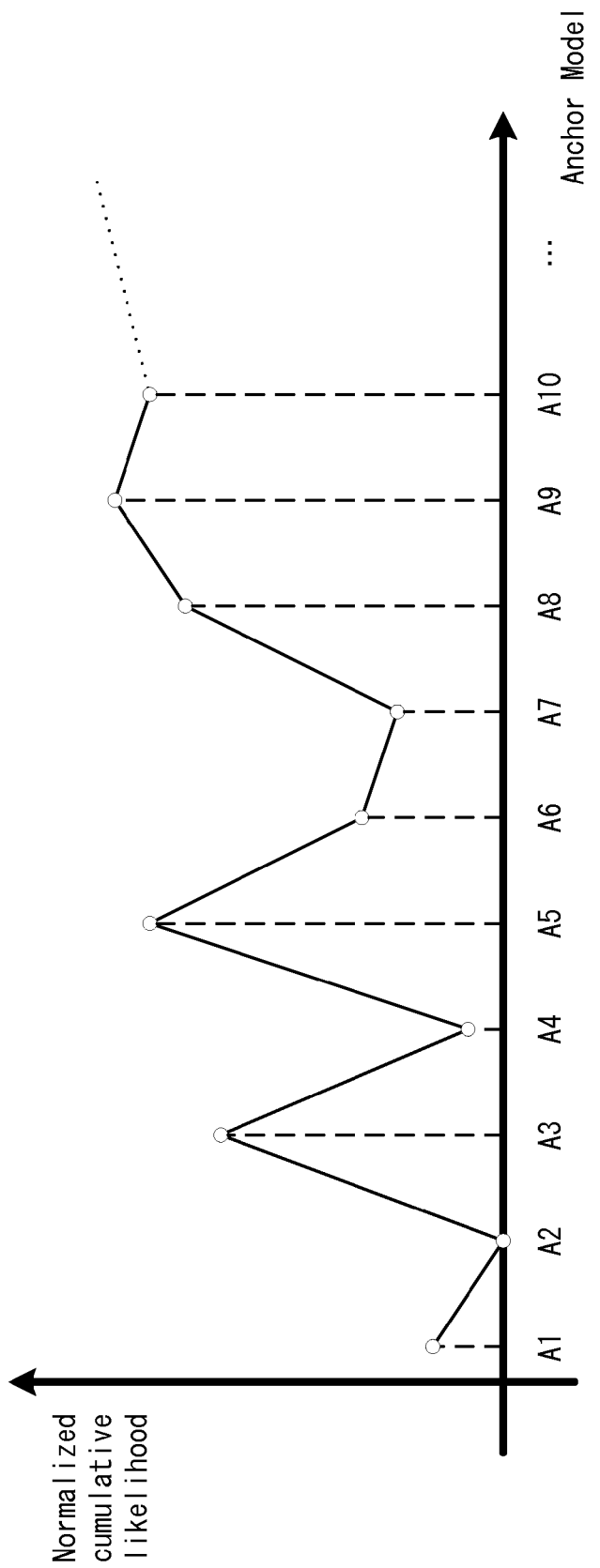
FIG. 7 illustrates an example of a frequency vector.

More specifically, the frequency vector NF is a normalized cumulative likelihood of likelihood vectors F included in the second unit section. In other words the frequency vector NF is obtained by normalizing cumulative values of components of the likelihood vectors F included in the second unit section. Herein, normalization refers to setting a norm of the frequency vector NF as 1. FIG. 7 is a schematic diagram illustrating an example of a frequency vector NF.

<2-6. Dominant Vectors>

Each dominant vector D is vector that accentuates magnitude of components of a corresponding frequency vector NF, thus simplifying judgment between different frequency vectors NF. In the present embodiment, an average value of all second unit sections is calculated for each component of the frequency vectors, and the dominant vector D used for the corresponding frequency vector, is a vector in which components of the frequency vector which are greater than a corresponding average value therefor are unchanged and components which are less than the corresponding average value are set as 0.

3. Configuration

The following explains functional configuration of a video editing apparatus 100 which is provided with an audio processing device 104 relating to the present embodiment.

<3-1. General Configuration>

Figure 8:
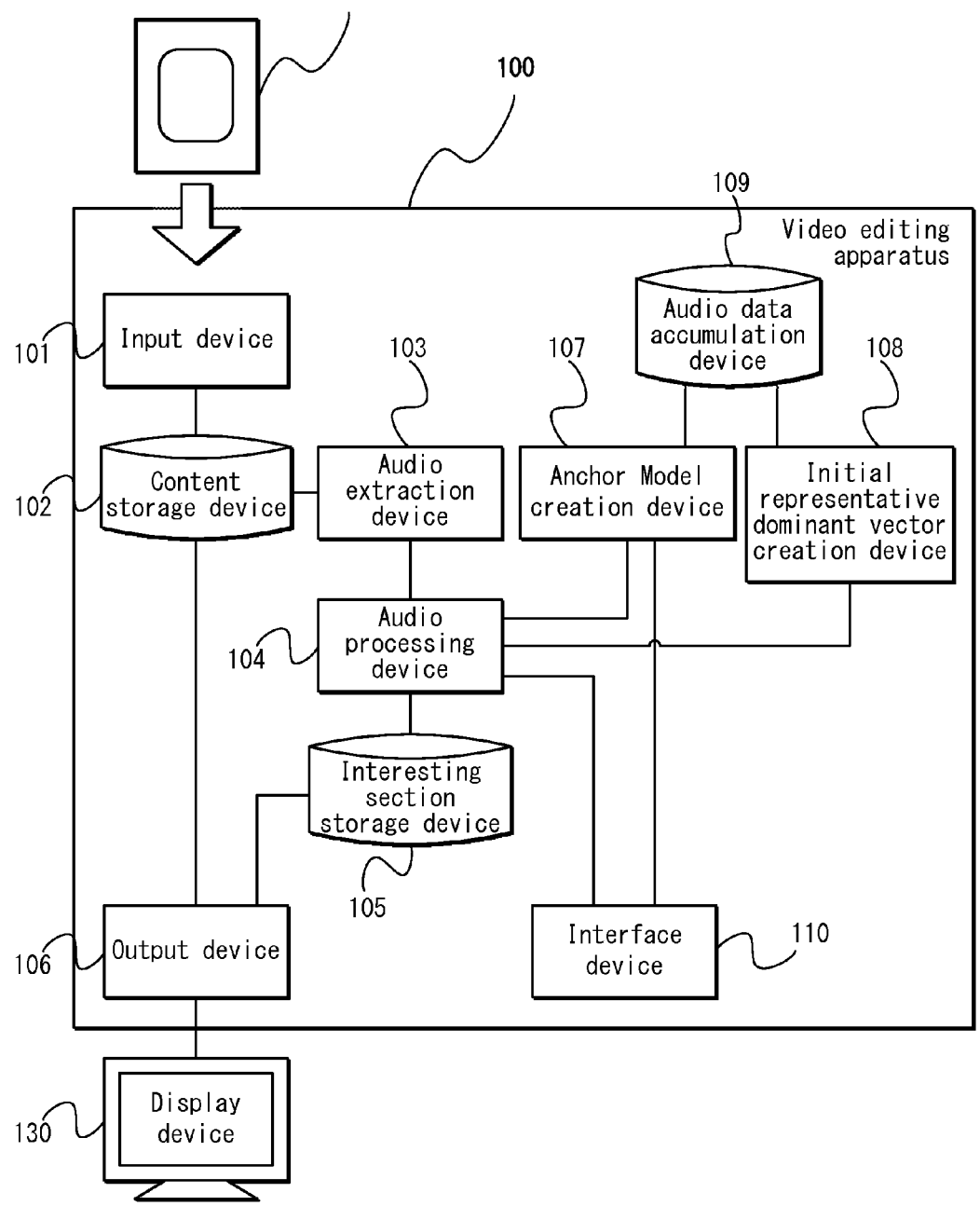
FIG. 8 is a block diagram illustrating an example of functional configuration of a video editing apparatus provided with the audio processing device.

FIG. 8 is a block diagram illustrating an example of functional configuration of the video editing apparatus 100. The video editing apparatus 100 includes an input device 101, a content storage device 102, an audio extraction device 103, the audio processing device 104, an interesting section storage device 105, an output device 106, an Anchor Model creation device 107, an initial representative dominant vector creation device 108, an audio data accumulation device 109 and an interface device 110.

<3-1-1. Input Device 101>

The input device 101 is configured by a disk drive or the like. When a recording medium 120 is loaded into the input device 101, the input device 101 acquires a video file by reading the video file from the recording medium 120, and subsequently stores the video file in the content storage device 102. The recording medium 120 is a medium capable of storing various types of data thereon, such as an optical disk, a floppy disk, an SD card or a flash memory.

<3-1-2. Content Storage Device 102>

The content storage device 102 is configured by a hard disk or the like. The content storage device 102 stores therein the video file acquired from the recording medium 120 by the input device 101. Each video file stored in the content storage device 102 is stored with a unique ID attached thereto.

<3-1-3. Audio Extraction Device 103>

The audio extraction device 103 extracts an audio signal from the video file stored in the content storage device 102 and subsequently inputs the audio signal into the audio processing device 104. The audio extraction device 103 performs decoding processing on an encoded audio signal, thus generating an audio signal X(t) such as illustrated in FIG. 2A.

<3-1-4. Audio Processing Device 104>

The audio processing device 104 performs detection of a feature unit section and extraction of an interesting section based on the audio signal X(t) input from the audio extraction device 103. The audio processing device 104 stores interesting section data in the interesting section storage device 105, indicating the interesting section which is extracted. Functional configuration of the audio processing device 104 is explained in detail further below.

<3-1-5. Interesting Section Storage Device 105>

The interesting section storage device 105 is configured by a hard disk or the like. The interesting section storage device 105 stores therein the interesting section data input from the audio processing device 104. The interesting section data includes the ID of the video file and times in the video file (times of a start point and an end point of the interesting section).

<3-1-6. Output device 106>

The output device 106 acquires the interesting section data from the interesting section storage device 105 and outputs pieces of image data corresponding to the interesting section data (part of the video file stored in the content storage device 102) to a display device 130. The output device 106 also has a function of outputting to the display device 130, a digest which is created by connecting image data for each of the pieces of interesting section data in order starting from earliest time in the video file.

<3-1-7. Anchor Model Creation Device 107>

The Anchor Model creation device 107 creates Anchor Models $A_r$ based on audio signals stored in the audio data accumulation device 109. The Anchor Model creation device 107 outputs the Anchor Models $A_r$ to the audio processing device 104. Functional configuration of the Anchor Model creation device 107 is explained in detail further below.

The audio signals used by the Anchor Model creation device 107 in creation of the Anchor Models $A_r$ are audio signals acquired in advance by extraction from a plurality of video files, which are not the video file which is targeted for extraction of the interesting section.

<3-1-8. Initial Representative Dominant Vector Creation Device 108>

The initial representative dominant vector creation device 108 creates initial representative dominant vectors DD based on audio signals stored in the audio data accumulation device 109. The initial representative dominant vector creation device 108 outputs the initial representative dominant vectors DD to the audio processing device 104. Functional configuration of the initial representative dominant vector creation device 108 is explained in detail further below.

The audio signals used in creation of the initial representative dominant vectors DD by the initial representative dominant vector creation device 108 are audio signals which are categorized in advance for each of a representative group of human related actions. Each of the initial representative dominant vectors DD is a dominant vector expressing features of a representative action, which is used as a reference in detection of feature unit sections.

<3-1-9. Audio Data Accumulation Device 109>

The audio data accumulation device 109 stores therein in advance, audio data which is used in creation of the Anchor Models $A_r$ by the Anchor Model creation device 107 and in creation of the initial representative dominant vectors DD by the initial representative dominant vector creation device 108.

<3-1-10. Interface Device 110>

The interface device 110 is provided with an operation unit (not illustrated) such as keyboard or the like. The interface device 110 receives an input operation from a user and notifies the audio processing device 104 and the Anchor Model creation device 107. For example, the interface device 110 notifies the audio processing device 104 of user feedback information indicating an evaluation by the user of an extracted interesting section and an upper limit le of interesting section length when extracting an interesting section, and the interface device 110 notifies the Anchor Model creation device 107 of a number K of Anchor Models to be created.

The evaluation by the user referred to above may be input by the user directly indicating quality of the interesting section, or alternatively may be judged based on the whether the user elects to view or skip an image corresponding to the interesting section.

<3-2. Audio Processing Device 104>

The audio processing device 104 is configured by a memory (not illustrated) and one or more processors (not illustrated). The audio processing device 104 implements a configuration shown in FIG. 9, through execution by the processor of a program written in the memory.

Figure 9:
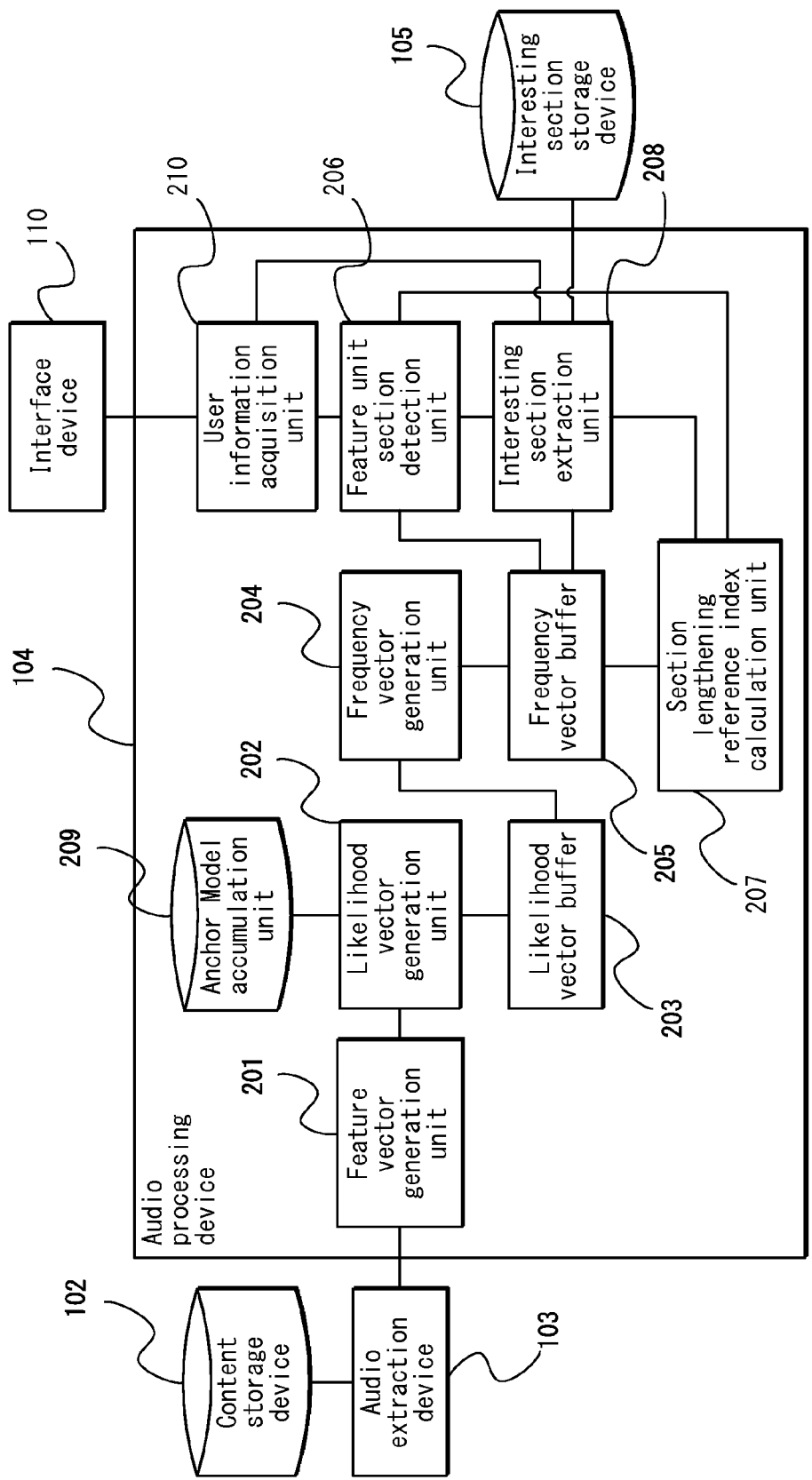
FIG. 9 is a block diagram illustrating an example of functional configuration of the audio processing device.

FIG. 9 is a block diagram illustrating an example of functional configuration of the audio processing device 104. As illustrated in FIG. 9, the audio processing device 104 includes a feature vector generation unit 201, a likelihood vector generation unit 202, a likelihood vector buffer 203, a frequency vector generation unit 204, a frequency vector buffer 205, a feature unit section detection unit 206, a section lengthening reference index calculation unit 207, an interesting section extraction unit 208, an Anchor Model accumulation unit 209 and a user information acquisition unit 210. The following explains configuration of each of the above elements.

<3-2-1. Feature Vector Generation Unit 201>

The feature vector generation unit 201 generates a feature vector M for each first unit section based on the audio signal X(t) input from the audio extraction device 103.

The following is an overview of generation of the feature vector M based on the audio signal X(t).

Figure 2B:
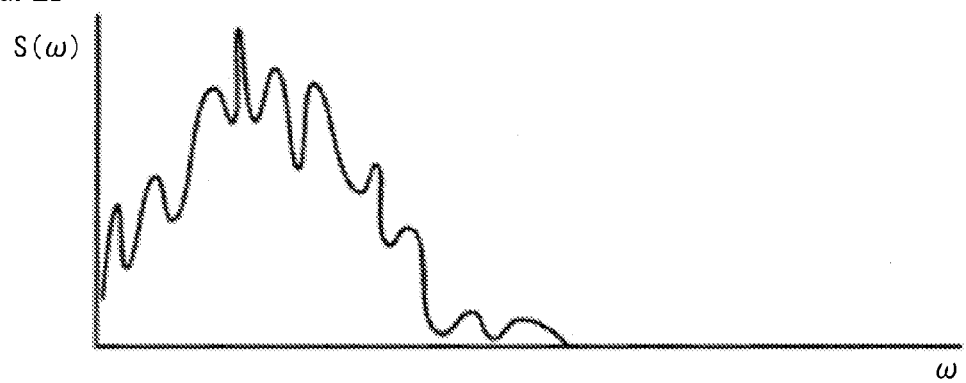

Firstly, the feature vector generation unit 201 calculates a power spectrum $S(\omega)$ of the audio signal X(t) in the first unit section (refer to FIG. 2B). The power spectrum $S(\omega)$ is calculated by converting the time axis of the audio signal X(t) to a frequency axis and by squaring each frequency component.

Figure 2C:
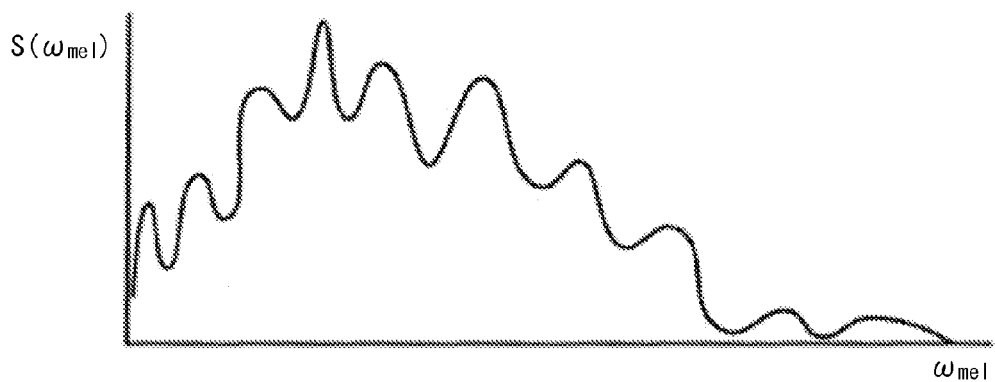

Next, the feature vector generation unit 201 calculates a mel-frequency spectrum $S(\omega_{mel})$ by converting the frequency axis of the power spectrum $S(\omega)$ to a mel-frequency axis (refer to FIG. 2C).

Finally, the feature vector generation unit 201 calculates a mel-frequency cepstrum from the mel-frequency spectrum $S(\omega_{mel})$ and sets a predetermined number of components (26 in the present embodiment) as the feature vector M.

<3-2-2. Anchor Model Accumulation Unit 209>

The Anchor Model accumulation unit 209 is configured as a region in the memory and stores therein the Anchor Models $A_r$ created by the Anchor Model creation device 107. In the present embodiment the Anchor Model accumulation unit 209 stores the Anchor Models $A_r$ in advance of execution of processing for interesting section extraction.

<3-2-3. Likelihood Vector Generation Unit 202>

The likelihood vector generation unit 202 generates a likelihood vector F for each first unit section. The likelihood generation unit 202 uses a corresponding feature vector M generated by the feature vector generation unit 201 and the Anchor Models $A_r$ accumulated in the Anchor Model accumulation unit 209 to calculate a likelihood $L_r$ for the audio signal X(t) with regards to each sound piece. The likelihood generation unit 202 sets the likelihoods $L_r$ as components of the likelihood vector F.

<3-2-4. Likelihood Vector Buffer 203>

The likelihood vector buffer 203 is configured as a region in the memory. The likelihood vector buffer 203 stores therein the likelihood vectors F generated by the likelihood vector generation unit 202.

<3-2-5. Frequency Vector Generation Unit 204>

The frequency vector generation unit 204 generates a frequency vector NF for each second unit section based on the likelihood vectors F stored in the likelihood vector buffer 203.

<3-2-6. Frequency Vector Buffer 205>

The frequency vector buffer 205 is configured as a region in the memory. The frequency vector buffer 205 stores therein the frequency vectors NF generated by the frequency vector generation unit 204.

<3-2-7. User Information Acquisition Unit 210>

The user information acquisition unit 210 acquires user information from the interface device 110, such as the user feedback information and the upper limit le for interesting section length.

<3-2-8. Feature Unit Section Detection Unit 206>

Figure 10:
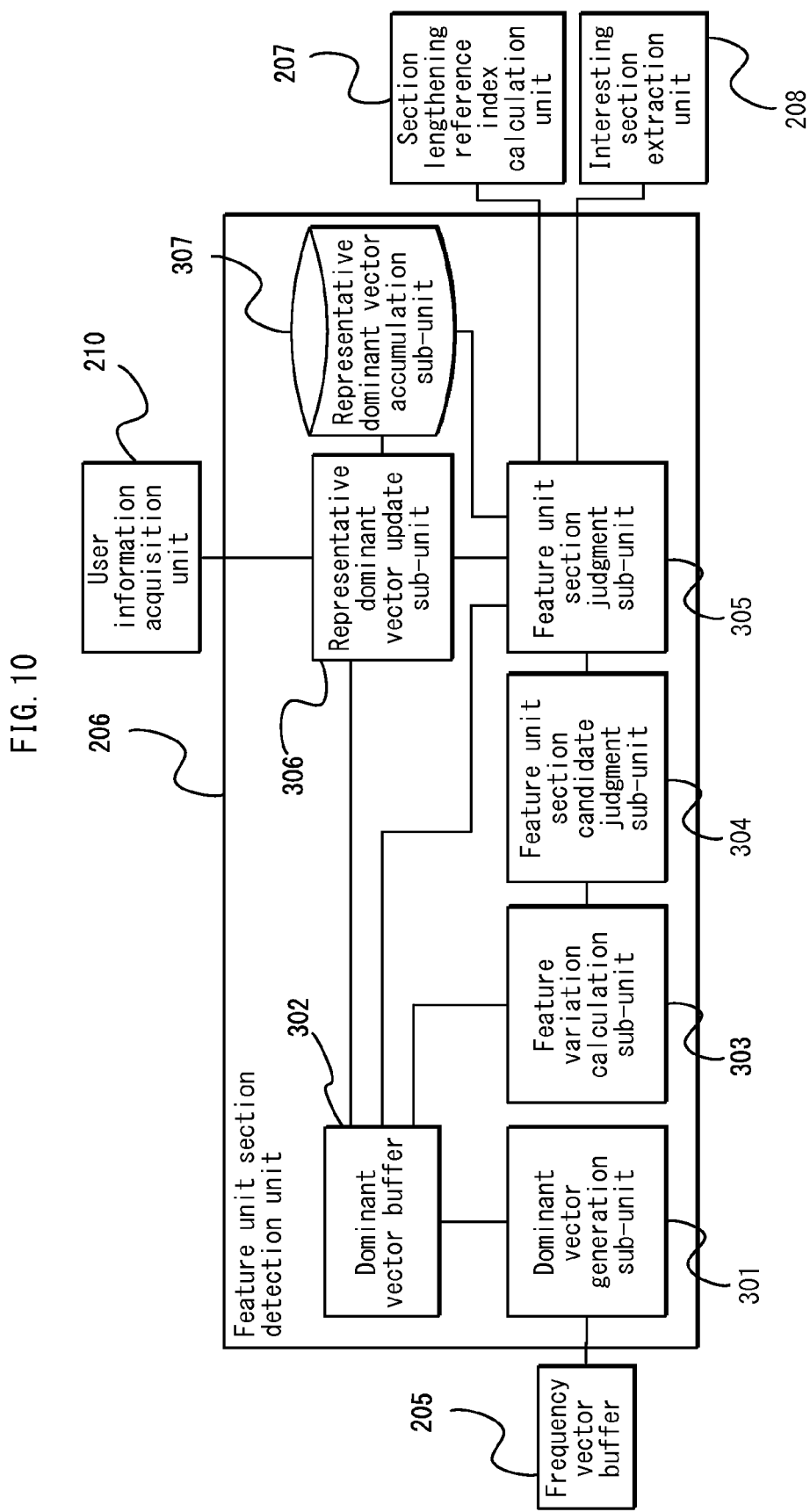
FIG. 10 is a block diagram illustrating an example of functional configuration of a feature unit section detection unit.

The feature unit-section detection unit 206 detects feature unit sections based on the frequency vectors NF stored in the frequency vector buffer 205. FIG. 10 is a block diagram illustrating an example of functional configuration of the feature unit section detection unit 206. As illustrated in FIG. 10, the feature unit section detection unit 206 includes a dominant vector generation sub-unit 301, a dominant vector buffer 302, a feature variation calculation sub-unit 303, a feature unit section candidate judgment sub-unit 304, a feature unit section judgment sub-unit 305, a representative dominant vector update sub-unit 306 and a representative dominant vector accumulation sub-unit 307. The following explains configuration of each of the above elements.

<3-2-8-1. Dominant Vector Generation Sub-Unit 301>

The dominant vector generation sub-unit 301 generates a dominant vector D for each second unit section using a corresponding frequency vector NF stored in the frequency vector buffer 205.

<3-2-8-2. Dominant Vector Buffer 302>

The dominant vector buffer 302 is configured as a region in the memory. The dominant vector buffer 302 stores therein the dominant vectors D generated by the dominant vector generation sub-unit 301.

<3-2-8-3. Feature Variation Calculation Sub-Unit 303>

Figure 11:
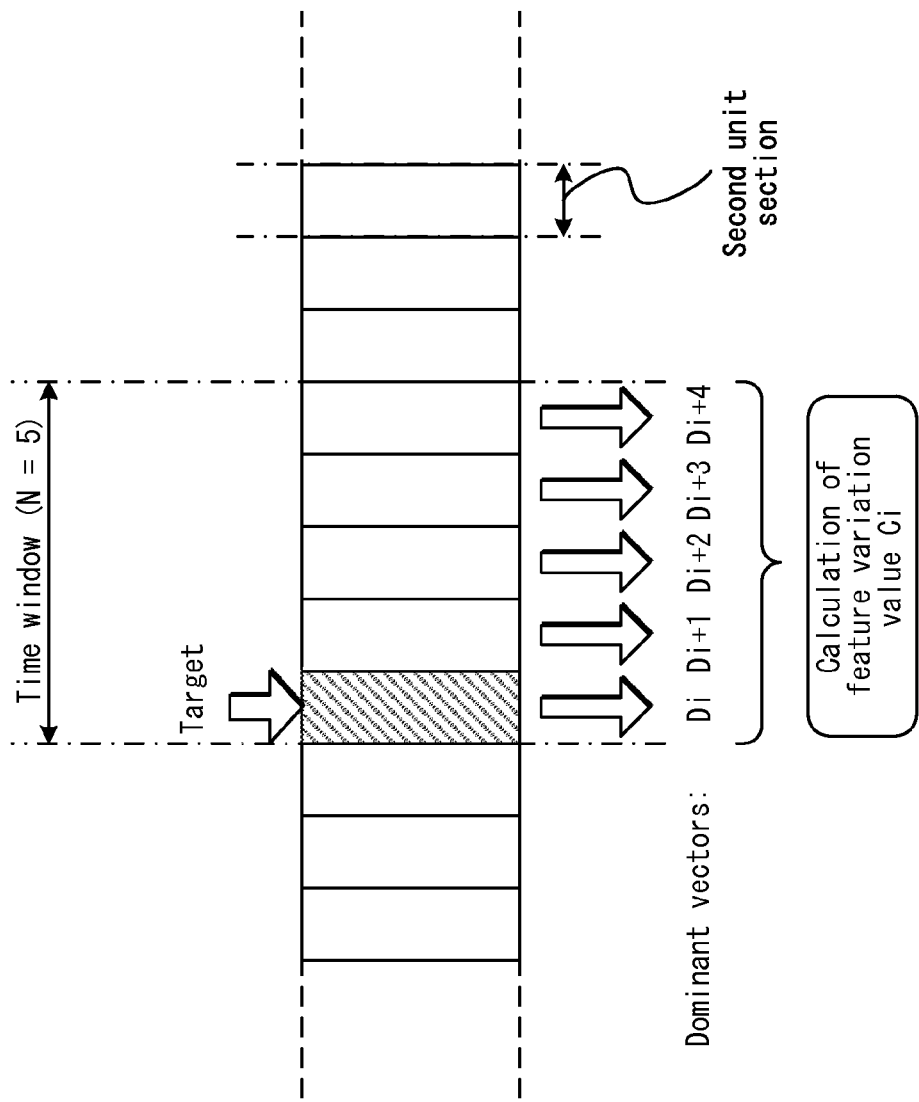
FIG. 11 illustrates an example of a time window used in calculation of a feature variation value.

The feature variation calculation sub-unit 303 calculates a feature variation value C for each second unit section using the dominant vectors D stored in the dominant vector buffer 302. The feature variation value C quantifies temporal variation of the features of the audio signal. As illustrated in FIG. 11, a feature variation value $C_i$ for which an $i^{th}$ second unit section from time 0 is a target, is calculated from MATH 1 by using the dominant vectors D of second unit sections included in a time window of N second unit sections (N=5 for example). The time window is inclusive of the $i^{th}$ second unit section.

$$Ci = \sum_{j=i+1}^{i+N-1} \cos\theta_{ij} = \sum_{j=i+1}^{i+N-1} \frac{\langle Di, Dj \rangle}{\|Di\| \cdot \|Dj\|} \quad [\text{MATH 1}]$$

In MATH 1, $D_i$ and $D_j$ are dominant vectors $D_i$ and $D_j$ respectively of the $i^{th}$ second unit section and a $j^{th}$ second unit section from time 0. In MATH 1, $\langle D_i, D_j \rangle$ represents an inner product of the dominant vectors $D_i$ and $D_j$, and $\|D_i\|$ and $\|D_j\|$ respectively represent norms of the dominant vectors $D_i$ and $D_j$. In MATH 1, $\theta_{ij}$ represents an angle formed between the dominant vectors $D_i$ and $D_j$.

As shown by MATH 1, the feature variation value $C_i$ is the sum total of cosine similarities of the dominant vector $D_i$ of the second unit section which is the target, and each other dominant vector $D_j$ included in the time window. Consequently, the feature variation value C is low if the features of the audio signal vary between the second unit section which is the target and other second unit sections included in the time window, and the feature variation value C is high if the features of the audio signal do not vary.

The feature variation calculation sub-unit 303 calculates the feature variation value C for each second unit section while gradually shifting the time window along the time axis.

<3-2-8-4. Feature Unit Section Candidate Judgment Sub-Unit 304>

Figure 12:
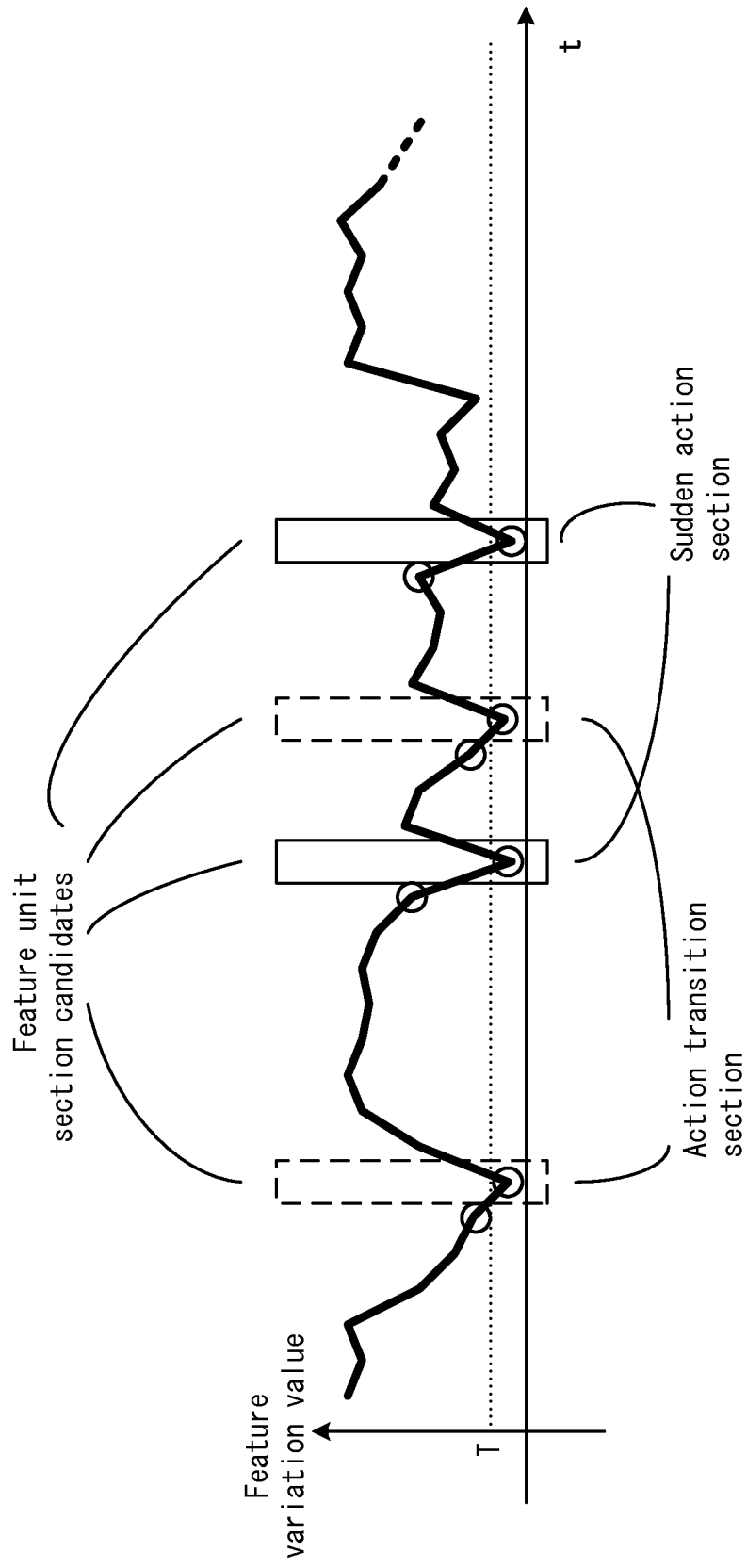
FIG. 12 illustrates an example of feature unit section candidates.

As illustrated in FIG. 12, the feature unit section candidate judgment sub-unit 304, based on the feature variation values C calculated by the feature variation calculation sub-unit 303, judges every second unit section for which the feature variation value C is lower than a threshold value Th1 to be a feature unit section candidate. In the present embodiment, the threshold value Th1 is calculated using MATH 2 shown below, wherein L represents a total number of second unit sections in the audio signal.

$$Th1 = \frac{1}{2L}\sum_{i=1}^{L} Ci \qquad [\text{MATH 2}]$$

The feature unit section candidate judgment sub-unit 304 judges a feature unit section to be a sudden action section (a section surrounded by an unbroken line in FIG. 12) when the feature variation value C of the feature unit section candidate exhibits a rapid change (steep gradient) to be lower than the threshold value Th1, in other words when difference compared to a feature variation value of a directly preceding second unit section is large. The feature unit section candidate judgment sub-unit 304 judges a feature unit section candidate to be an action transition section (a section surrounded by a dashed line in FIG. 12) when the feature variation value C of the feature unit section candidate exhibits a gradual change (gentle gradient) to be lower than the threshold value Th1, in other words when difference compared to a feature variation value of a directly preceding second unit section is small. In the present embodiment, when the difference between the feature variation value of the feature unit section candidate and the feature variation value of the directly preceding second unit section is greater than a predetermined threshold value Th2 (for example Th2=2), the feature unit section candidate is judged to be a sudden action section, and when the difference is no greater than the threshold value Th2, the feature unit section candidate is judged to be an action transition section.

<3-2-8-5. Feature Unit Section Judgment Sub-Unit 305>

The following continues explanation of configuration of the feature unit section detection unit 206 with reference to FIG. 10. The feature unit section judgment sub-unit 305 judges whether a feature unit section should be extracted using the dominant vectors D stored in the dominant vector buffer 302, the feature unit section candidate detected by the feature unit section candidate judgment sub-unit 304, and the representative dominant vectors DD stored in the representative dominant vector accumulation sub-unit 307.

Specifically, the feature unit section judgment sub-unit 305 first calculates degrees of similarity between the dominant vector D of the feature unit section candidate and each of the representative dominant vectors DD stored in the representative dominant vector accumulation sub-unit 307. Next, the feature unit section judgment sub-unit 305 compares each of the degrees of similarity to a threshold value Th3 (for example Th3=0.6). When any of the degrees of similarity exceeds the threshold value Th3, the feature unit section judgment sub-unit 305 judges that the feature unit section candidate is a feature unit section which should be extracted. In contrast to the above, when none of the degrees of similarity exceeds the threshold value Th3, the feature unit section judgment sub-unit 305 judges that the feature unit section candidate is not a feature unit section which should be extracted.

Through judgment using the representative dominant vectors, the feature unit section judgment sub-unit 305 is able to exclude, from among all feature unit section candidates which are detected, sections which are not required by the user, and thus is able to extract only sections which are desired by the user.

<3-2-8-6. Representative Dominant Vector Update Sub-Unit 306>

The representative dominant vector update sub-unit 306 acquires a dominant vector D from the dominant vector buffer 302 for a feature unit section of an interesting section which is evaluated highly by the user, based on the user feedback information input via the user information acquisition unit 210. The representative dominant vector update sub-unit 306 sets the dominant vector D as a user representative dominant vector UDD.

Through the above configuration, feature unit sections included in interesting sections which are evaluated highly by the user can be detected more easily, and therefore extraction of interesting sections can be performed appropriately for each individual user.

<3-2-8-7. Representative Dominant Vector Accumulation Sub-Unit 307>

The representative dominant vector accumulation sub-unit 307 is configured as a region in the memory. The representative dominant vector accumulation sub-unit 307 stores therein as representative dominant vectors DD, the initial representative dominant vectors created by the initial representative dominant vector creation device 108 and the user representative dominant vectors UDD created by the representative dominant vector update sub-unit 306. In the present embodiment, the representative dominant vector accumulation sub-unit 307 stores the representative dominant vectors DD in advance of execution of processing for interesting section extraction.

Through the configuration described above in sections <3-2-8-1> to <3-2-8-7>, the feature unit section detection unit 206 detects a feature unit section from the audio signal and outputs feature unit section data, indicating the feature unit section which is detected, to the section lengthening reference index calculation unit 207 and the interesting section extraction unit 208. The feature unit section data is information indicating a number, relative to time 0, of a second unit section which is the feature unit section and information identifying whether the feature unit section is a sudden action section or an action transition section. The following continues explanation of configuration of the audio processing device 104 with reference to FIG. 9.

<3-2-9. Section Lengthening Reference Index Calculation Unit 207>

The section lengthening reference index calculation unit 207 calculates a reference section, a reference vector S and a threshold value Rth, based on a feature unit section detected by the feature unit section detection unit 206. The reference section, the reference vector S and the threshold value Rth form a reference index used in processing for section lengthening.

Explanation is given first for a situation in which the feature unit section detected by the feature unit section detection unit 206 is a sudden action section.

Figure 13:
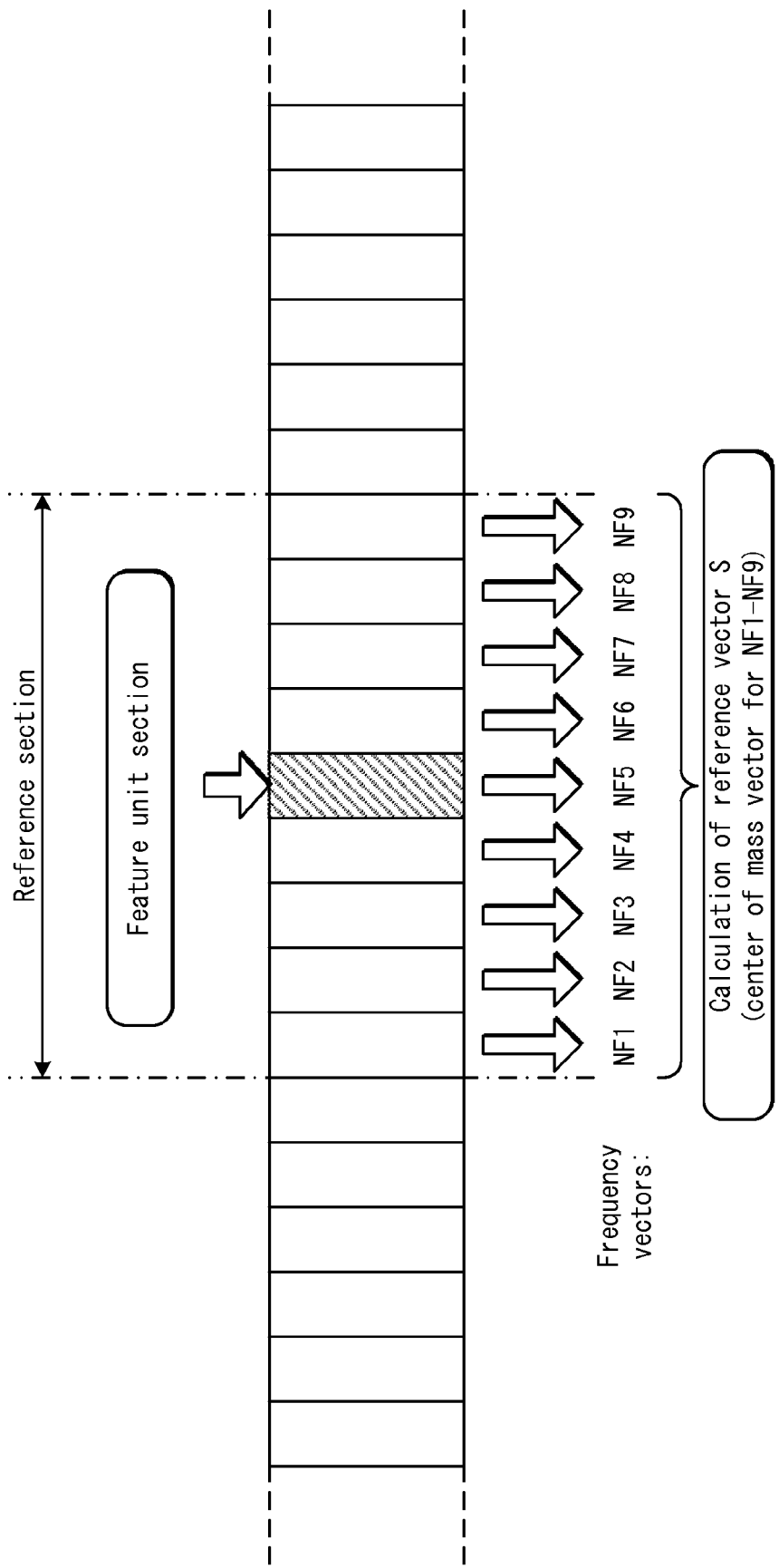
FIG. 13 illustrates an example of a reference section used in calculation of a reference vector.

The section lengthening reference index calculation unit 207 sets as a reference section, a plurality of second unit sections close to the feature unit section. The section lengthening reference index calculation unit 207 acquires frequency vectors for the reference section from the frequency vector buffer 205, and calculates a center of mass vector of the plurality of frequency vectors acquired from the frequency vector buffer 205 as a reference vector S. FIG. 13 illustrates an example in which the reference section consists of 9 second unit sections close to the feature unit section, and the reference vector S is calculated using frequency vectors (NF1-NF9) for the reference section.

The section lengthening reference index calculation unit 207 calculates a Euclidean distance between the reference vector S and each of the frequency vectors NF used in generating the reference vector S. A greatest Euclidean distance among the Euclidean distances which are calculated is set as a threshold value Rth, which is used in judging inclusion in an interesting section.

Figure 14:
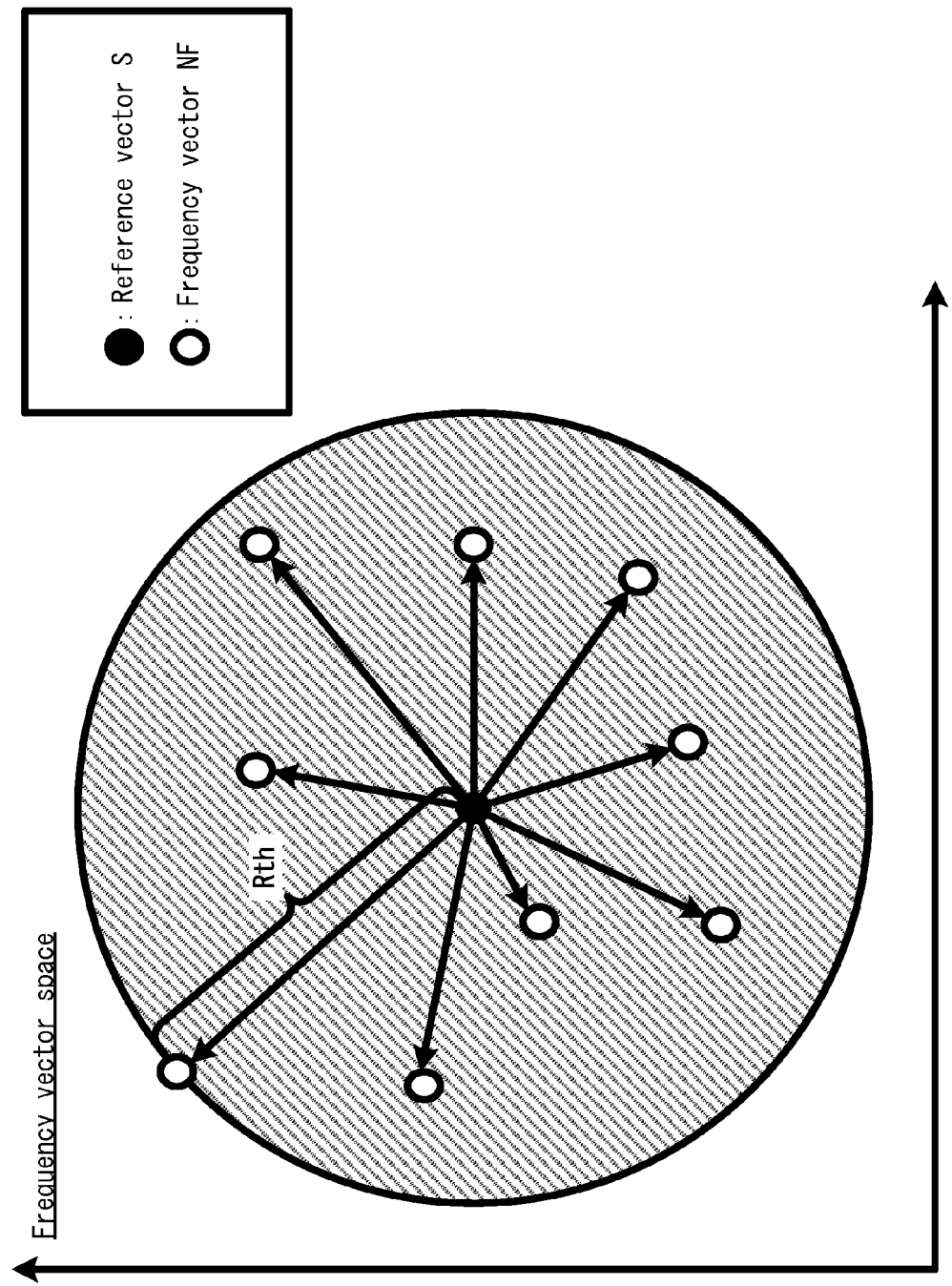
FIG. 14 is conceptual diagram of a vector space which illustrates the reference vector, the frequency vectors and a threshold value.

FIG. 14 is a conceptual diagram of a vector space used to illustrate the reference vector S, each of the frequency vectors NF and the threshold value Rth. In FIG. 14, each white circle represents one of the plurality of frequency vectors NF (the frequency vectors NF1-NF9 in the reference section illustrated in FIG. 13) used in calculation of the reference vector S, and a black circle positioned centrally in a region shown by a hatched circle represents the reference vector S. Length of arrows from the reference vector S to the frequency vectors NF represent the Euclidean distances between the reference vector S and the frequency vectors NF, and the greatest Euclidean distance, among the Euclidean distances represented by the arrows, is the threshold value Rth.

Explanation is given next of differences in a situation in which the feature unit section detected by the feature unit section detection unit 206 is an action transition section, compared to the situation in which the feature unit section is a sudden action section.

Figure 15:
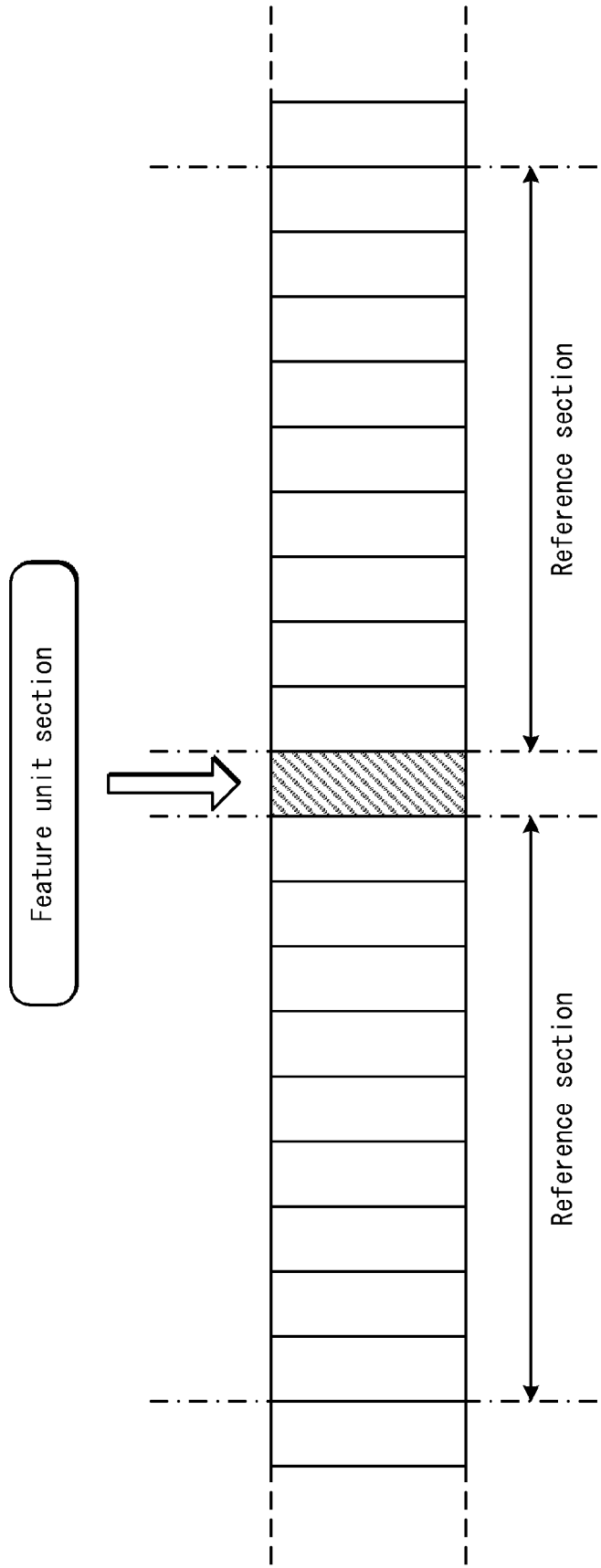
FIG. 15 illustrates an example of reference sections for an action transition section.

In the situation where the feature unit section is an action transition section, the section lengthening reference index calculation unit 207 calculates a reference vector S and a threshold value Rth separately for before and after the feature unit section. In other words, a first reference section is set before the feature unit section and a second reference section is set after the feature unit section. A reference vector S1 and a threshold value Rth1 are calculated using the first reference section, and a reference vector S2 and a threshold value Rth2 are calculated using the second reference section. As illustrated in FIG. 15, in the present embodiment the first and second reference sections each consist of 9 second unit sections respectively before and after the feature unit section.

<3-2-10. Interesting Section Extraction Unit 208>

The interesting section extraction unit 208, illustrated in FIG. 9, extracts an interesting section from the video file using the frequency vectors NF stored in the frequency vector buffer 205, the feature unit section detected by the feature unit section detection unit 206 and the reference index (reference section, reference vector S and threshold value Rth) calculated by the section lengthening reference index calculation unit 207. In other words, the interesting section extraction unit 208 specifies a start point and an end point of the interesting section.

The following is a detailed explanation for the situation in which the feature unit section is a sudden action section. Explanation is also given of differences in the situation when the feature unit section is an action transition section.

Figure 16:
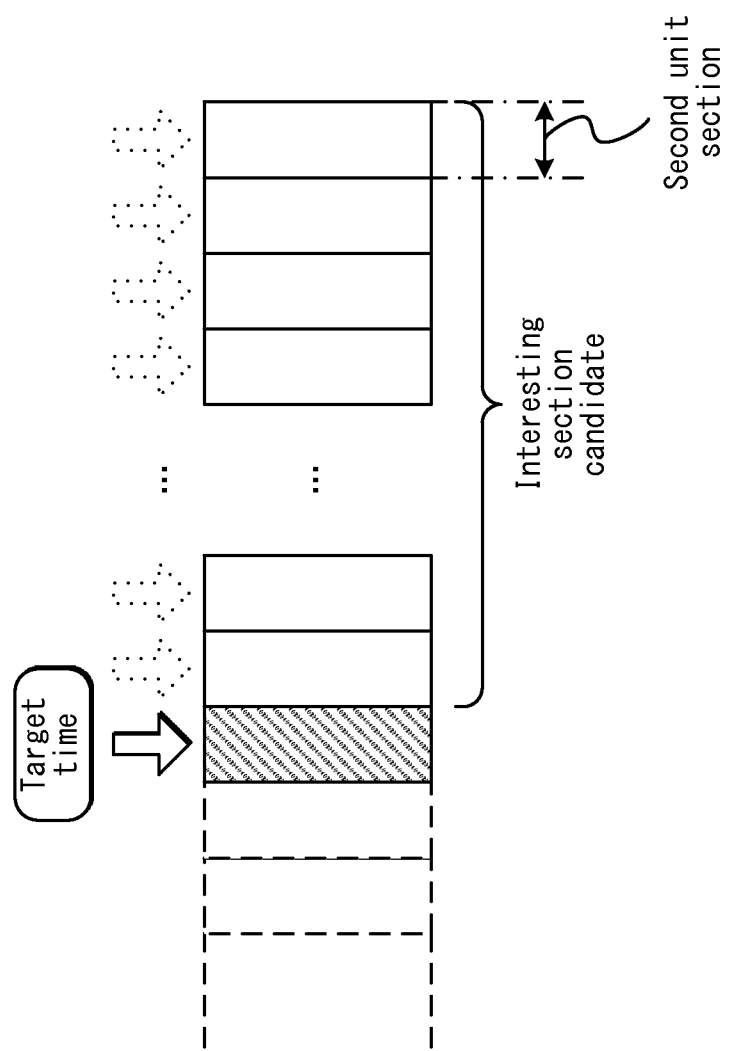
FIG. 16 illustrates processing for section lengthening of an interesting section in a reverse direction along a time axis.

First, the interesting section extraction unit 208 sets the reference section calculated by the section lengthening reference index calculation unit 207 as an initial value for the interesting section. As illustrated in FIG. 16, proceeding in a reverse direction along the time axis, the interesting section extraction unit 208 sets a second unit section directly before the interesting section as a target section, and performs a judgment as to whether to include the target section in the interesting section. More specifically, the interesting section extraction unit 208 calculates a Euclidean distance between the frequency vector NF of the target section and the reference vector S, and when the Euclidean distance is no greater than the threshold value Rth, the interesting section extraction unit 208 includes the target section in the interesting section. The interesting section extraction unit 208 repeats the above processing, and specifies the start point of the interesting section when Euclidean distance calculated thereby first exceeds the threshold value Rth.

In the above processing, the interesting section is lengthened one section at a time and thus is referred to as processing for section lengthening. The interesting section extraction unit 208 also performs processing for section lengthening in a forward direction along the time axis in order to specify the end point of the interesting section.

In terms of the vector space illustrated in FIG. 14, the frequency vector NF of each second unit section included in the interesting section exists within the region (hatched circle) which has the reference vector S as a center and which is within the threshold value (Euclidean distance) Rth.

In the situation where the feature unit section is an action transition section, the interesting section extraction unit 208 sets a section from a start point of the first reference section to an end point of the second reference section as an initial value for the interesting section. In order to specify the start point of the interesting section, the interesting section extraction unit 208 performs processing for section lengthening using the first reference vector S1 and the threshold value Rth1, and in order to specify the end point of the interesting section, the interesting section extraction unit 208 performs processing for section lengthening using the second reference vector S2 and the threshold value Rth2.

When the interesting section extraction unit 208 judges whether the target section should be included in the interesting section during processing for section lengthening, the interesting section extraction unit 208 also judges whether length of the interesting section is shorter than a preset upper limit le for interesting section length. When the Euclidian distance does not exceed the threshold value Rth and also the length of the interesting section is shorter than the upper limit le for interesting section length, the interesting section extraction unit 208 includes the target section in the interesting section. In contrast to the above, when the length of the interesting section is equal to or greater than the upper limit le for interesting section length, the interesting section extraction unit 208 outputs the interesting section calculated at the current point in time.

The audio processing device 104 extracts interesting sections through the configuration described above in sections <3-2-1> to <3-2-10>. The following continues explanation of configuration of the video editing apparatus 100 illustrated in FIG. 8.

<3-3. Anchor Model Creation Device 107>

The Anchor Model creation device 107 is configured by a memory (not illustrated) and a processor (not illustrated). Through execution by the processor of a program written in the memory, the Anchor Model creation device 107 implements a configuration illustrated in FIG. 17.

Figure 17:
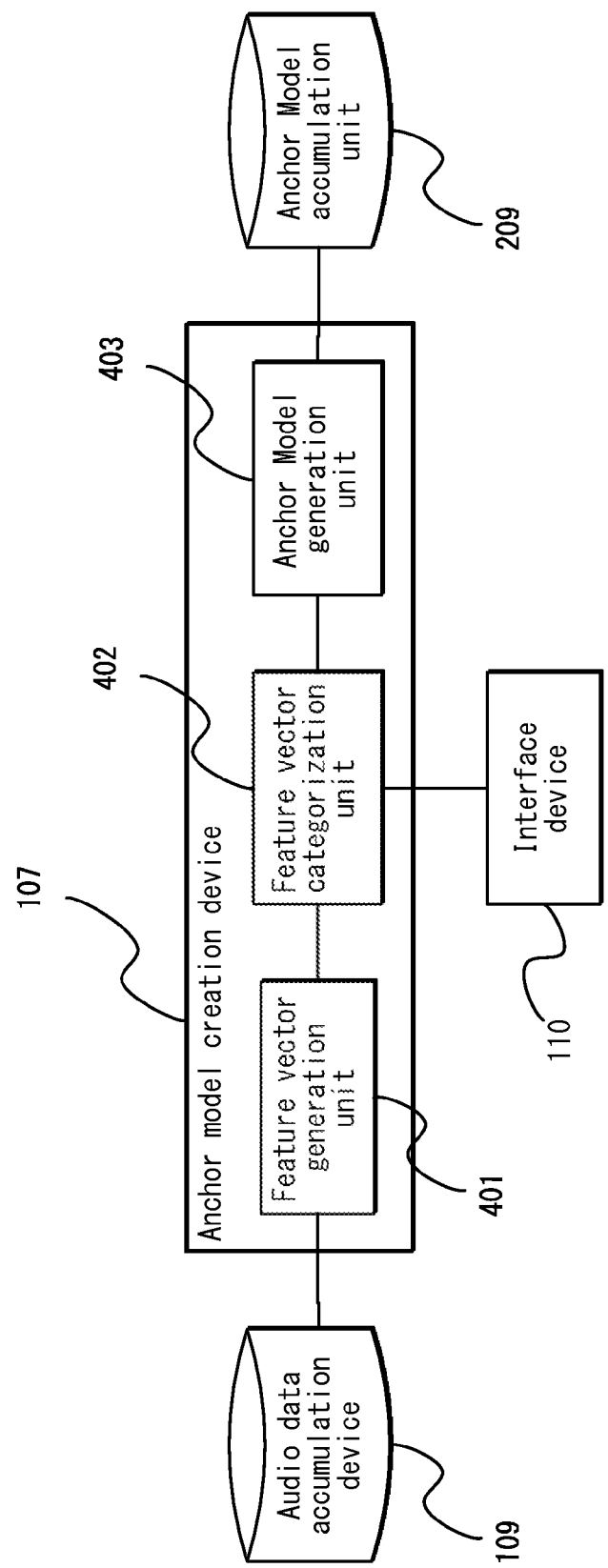
FIG. 17 is a block diagram illustrating an example of functional configuration of an Anchor Model creation device.

FIG. 17 is a block diagram illustrating functional configuration of the Anchor Model creation device 107 and related configuration elements. As illustrated in FIG. 17, the Anchor Model creation device 107 includes a feature vector generation unit 401, a feature vector categorization unit 402 and an Anchor Model generation unit 403. The Anchor Model creation device 107 has a function of creating Anchor Models based on audio data stored in the audio data accumulation device 109, and storing the Anchor Models in the Anchor Model accumulation unit 209. The following explains each of the above configuration elements.

<3-2-1. Feature Vector Generation Unit 401>

The feature vector generation unit 401 generates a feature vector M for each first unit section, based on audio data stored in the audio data accumulation device 109.

<3-3-2. Feature Vector Categorization Unit 402>

The feature vector categorization unit 402 performs clustering (categorization) of the feature vectors generated by the feature vector generation unit 401.

Based on the number K of Anchor Models $A_r$ input from the interface device 110, the feature vector categorization unit 402 categorizes the feature vectors M into K clusters using K-means clustering. In the present embodiment K=1024.

<3-3-3. Anchor Model Generation Unit 403>

The Anchor Model generation unit 403 calculates mean and variance values of each of the K clusters categorized by the feature vector categorization unit 402, and stores the K clusters in the Anchor Model accumulation unit 209 as Anchor Models $A_r$ (r=1, 2, ..., K).

<3-4. Initial Representative Dominant Vector Creation Device 108>

The initial representative dominant vector creation device 108 is configured by a memory (not illustrated) and a processor (not illustrated). Through execution by the processor of a program written in the memory, the initial representative dominant vector creation device 108 implements a configuration illustrated in FIG. 18.

Figure 18:
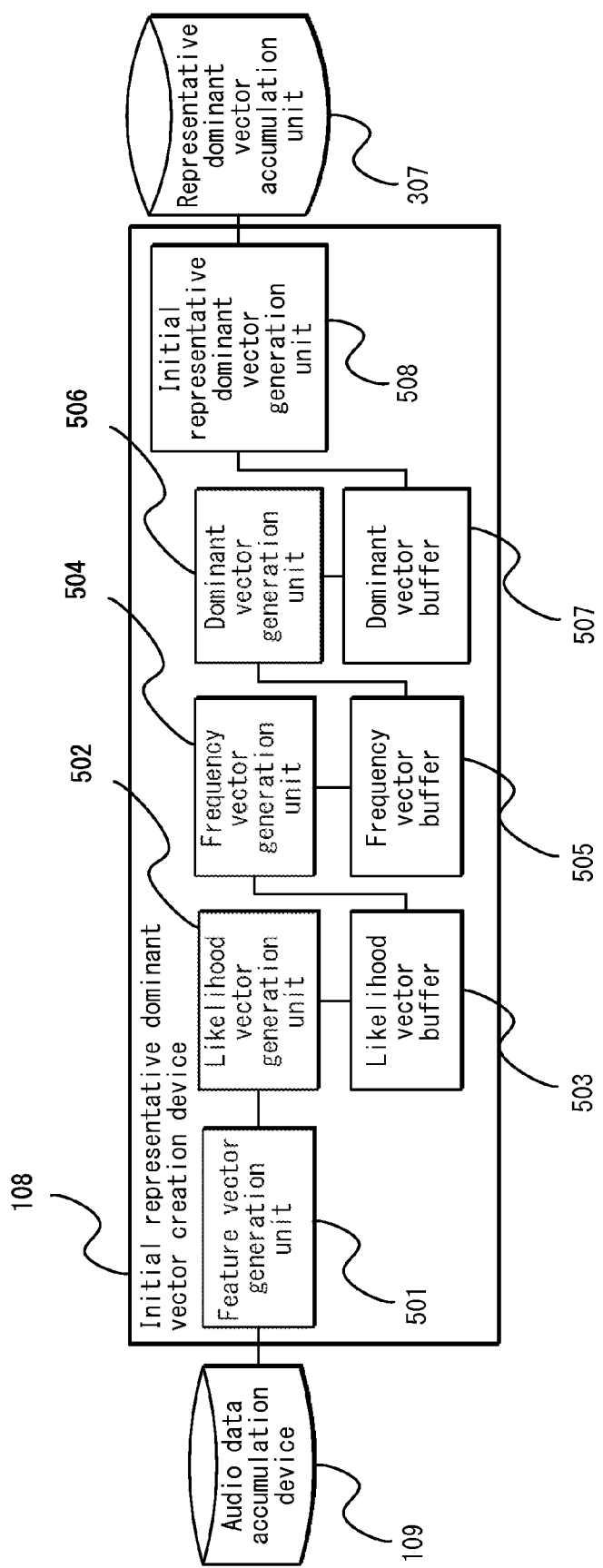
FIG. 18 is a block diagram illustrating an example of functional configuration of an initial representative dominant vector creation device.

FIG. 18 is a block diagram illustrating functional configuration of the initial representative dominant vector creation device 108 and related configuration elements. As illustrated in FIG. 18, the initial representative dominant vector creation device 108 includes a feature vector generation unit 501, a likelihood vector generation unit 502, a likelihood vector buffer 503, a frequency vector generation unit 504, a frequency vector buffer 505, a dominant vector generation unit 506, a dominant vector buffer 507 and an initial representative dominant vector generation unit 508. The initial representative dominant vector creation device 108 has a function of creating initial dominant vectors based on audio data stored in the audio data accumulation device 109 and subsequently storing the initial dominant vectors in the representative dominant vector accumulation unit 307.

As explained in section <3-1-8>, the audio data used by the initial representative dominant vector creation device 108 in creation of the initial representative dominant vectors DD is in the form of audio signals which are categorized in advance for a representative group of human related actions. The initial representative dominant vector creation device 108 thus generates an initial representative dominant vector for each of the above categories.

<3-4-1. Feature Vector Generation Unit 501>

The feature vector generation unit 501 generates a feature vector M for each first unit section, based on audio data stored in the audio data accumulation device 109.

<3-4-2. Likelihood Vector Generation Unit 502 and Likelihood Vector Buffer 503>

The likelihood vector generation unit 502 generates likelihood vectors for audio data stored in the audio data accumulation device 109 using the feature vectors generated by the feature vector generation unit 501 and the Anchor Models accumulated in the Anchor Model accumulation unit 209.

The likelihood vector buffer 503 is configured as a region in the memory. The likelihood vector buffer 503 stores therein the likelihood vectors generated by the likelihood vector generation unit 502.

<3-4-3. Frequency Vector Generation Unit 504 and Frequency Vector Buffer 505>

The frequency vector generation unit 504 generates a frequency vector for each second unit section based on the likelihood vectors stored in the likelihood vector buffer 503.

The frequency vector buffer 505 is configured as a region in the memory. The frequency vector buffer 505 stores therein the frequency vectors NF generated by the frequency vector generation unit 504.

<3-4-4. Dominant Vector Generation Unit 506 and Dominant Vector Buffer 507>

The dominant vector generation unit 506 generates dominant vectors using the frequency vectors stored in the frequency vector buffer 505.

The dominant vector buffer 507 is configured as a region in the memory. The dominant vector buffer 507 stores therein the dominant vectors generated by the dominant vector generation unit 506.

<3-4-5. Initial Representative Dominant Vector Generation Unit 508>

For the dominant vectors stored in the dominant vector buffer 507, the initial representative dominant vector generation unit 508 calculates a center of mass vector for each of the categories described above, and creates a representative dominant vector for each of the categories.

The video editing apparatus 100 relating to the present invention extracts interesting sections through the configuration described above, and subsequently outputs image data to a display device based on the interesting sections.

4. Operation

The following explains with reference to the drawings, processing for feature unit section detection executed by the feature unit section detection unit 206, processing for reference index calculation executed by the section lengthening reference index calculation unit 207, and processing for interesting section extraction executed by the interesting section extraction unit 208 relating to the present embodiment.

<4-1. Processing for Feature Unit Section Detection>

Figure 19:
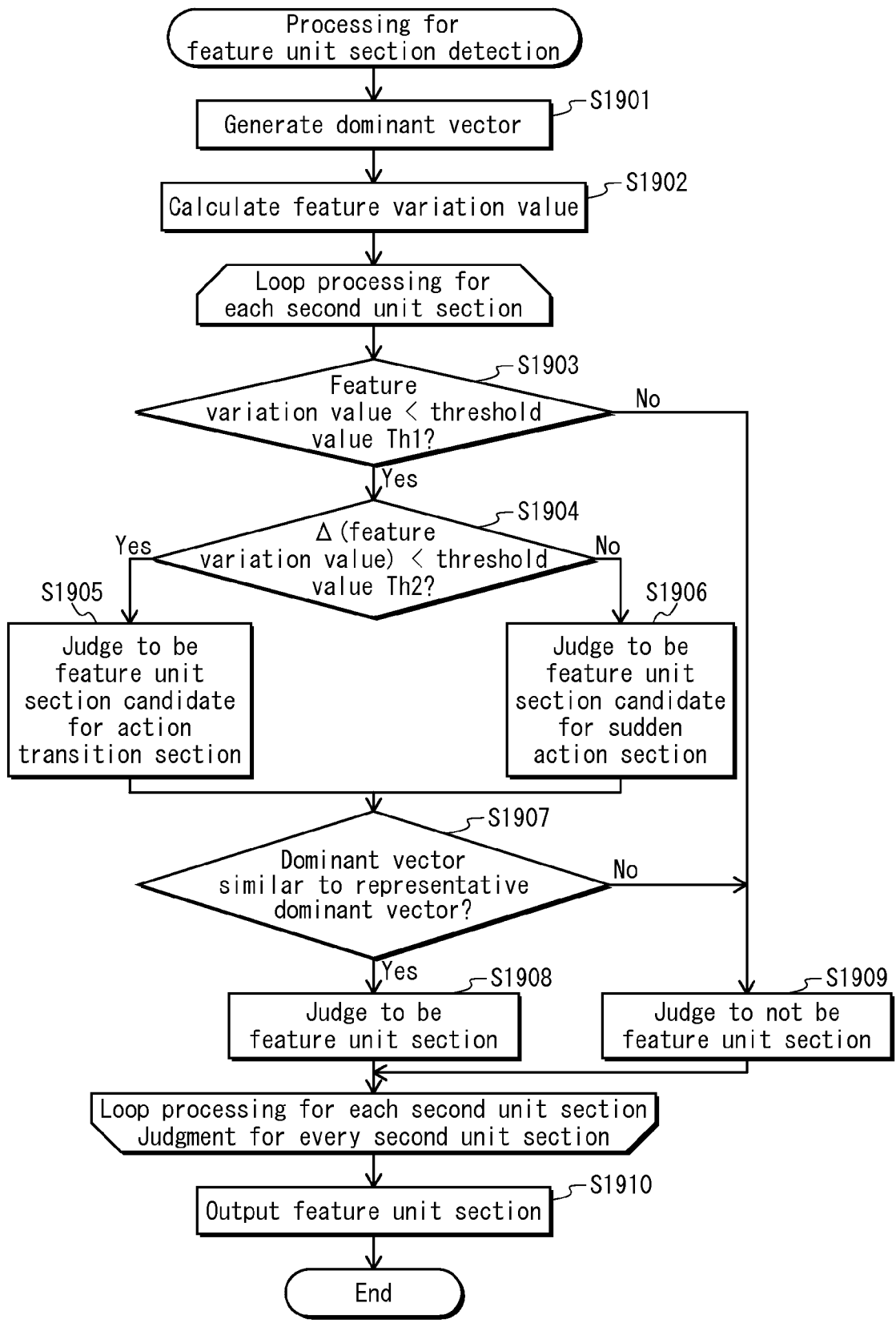
FIG. 19 is a flowchart illustrating processing for feature unit section detection.

FIG. 19 is a flowchart illustrating processing for feature unit section detection executed by the feature unit section detection unit 206 illustrated in FIG. 10. As illustrated in FIG. 19, the dominant vector generation sub-unit 301 first generates dominant vectors D using the frequency vectors NF input from the frequency vector buffer 205, and stores the dominant vectors D in the dominant vector buffer 302 (Step S1901).

Next, the feature variation calculation sub-unit 303 acquires, for each second unit section, N dominant vectors D from the dominant vector buffer 302 for a time window which includes N second unit-sections (N=5 for example), and calculates a feature variation value C for the second unit section (Step S1902).

Processing in Steps S1903-S1909 is performed for each second unit section of the audio signal from Step S 1902. Processing is explained below for an $i^{th}$ second unit section from time 0 of the audio signal.

The feature unit section candidate judgment sub-unit 304 compares a feature variation value C, of the $i^{th}$ second unit section to the threshold value Th1 which is set in advance (Step S1903).

When the feature variation value C, is less than the threshold value Th1 (Step S1903: Yes), the feature unit section candidate judgment sub-unit 304 calculates a difference ΔC between the feature variation value C, and a feature variation value $C_{i+1}$ of a second unit section directly before the $i^{th}$ second unit section. The feature unit section candidate judgment sub-unit 304 compares the difference ΔC to the threshold value Th2 which is set in advance (Step S1904).

When the difference ΔC is less than the threshold value Th2 (Step S1904: Yes), the feature unit section candidate judgment sub-unit 304 judges that the $i^{th}$ second unit section is a feature unit section candidate for an action transition section. When the difference ΔC is equal to or greater than the threshold value Th2 (Step S1904: No), the feature unit section candidate judgment sub-unit 304 judges that the $i^{th}$ second unit section is a feature unit section candidate for a sudden action section (Step S1906).

Next, the feature unit section judgment sub-unit 305 acquires a dominant vector corresponding to the $i^{th}$ second unit section from the dominant vector buffer 302. The feature unit section judgment sub-unit 305 judges similarity of the dominant vector to the representative dominant vectors stored in the representative dominant vector accumulation sub-unit 307 (Step S1907). More specifically, the feature unit section judgment sub-unit 305 performs the above judgment by calculating cosine degrees of similarity between the dominant vector and each of the representative dominant vectors which are stored, categorized into the plurality of categories, in the representative dominant vector accumulation sub-unit 307. The feature unit section judgment sub-unit 305 judges whether any of the degrees of similarity calculated above exceeds the threshold value Th3.

When any of the degrees of similarity exceeds the threshold value Th3 (Step S1907: Yes), the feature unit section judgment sub-unit 305 judges that the $i^{th}$ second unit section is a feature unit section (Step S1908).

When in Step S1903 the feature variation value C, is equal to or greater than the threshold value Th1 (Step S1903: No), or when in Step S1907 none of the degrees of similarity exceeds the threshold value Th3 (Step S1907: No), the feature unit section judgment sub-unit 305 judges that the $i^{th}$ second unit-section is not a feature unit section (Step S1909).

Steps S1903-S1909 described above are executed for each second unit section of the audio signal, thus each second unit section is judged whether or not to be a feature unit section.

Finally, the feature unit section detection unit 206 outputs each second unit section detected to be a feature unit section to the section lengthening reference index calculation unit 207 and the interesting section extraction unit 208.

<4-2. Processing for Reference Index Calculation>

Figure 20:
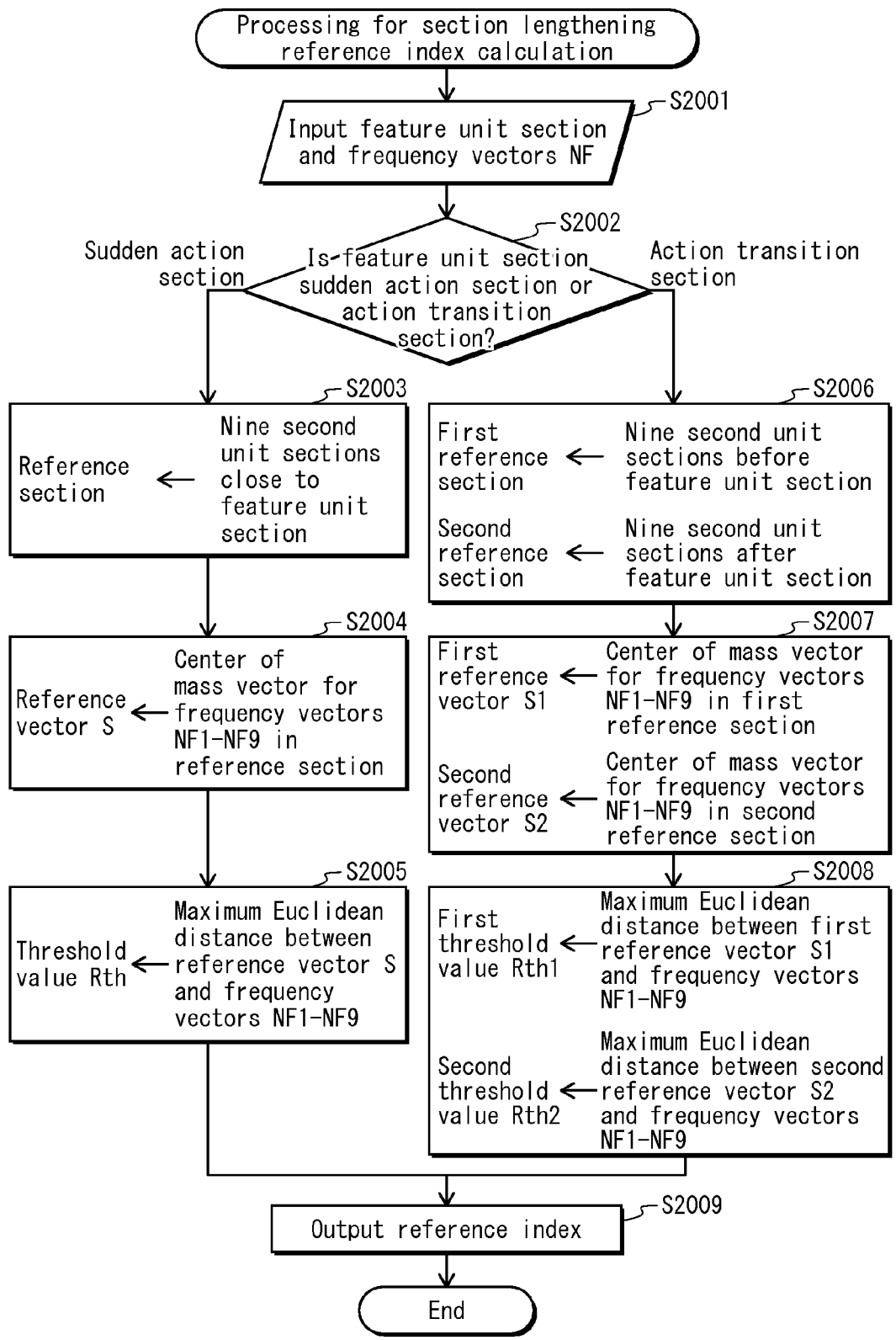
FIG. 20 is a flowchart illustrating processing for section lengthening reference index calculation.

FIG. 20 is a flowchart illustrating processing for reference index calculation which is executed by the section lengthening reference index calculation unit 207. As illustrated in FIG. 20, each of the feature unit sections detected by the feature unit section detection unit 206 and the frequency vectors stored in the frequency vector buffer 205 are used as input for the processing for reference index calculation (Step S2001).

For each of the feature unit sections input from the feature unit section detection unit 206, the section lengthening reference index calculation unit 207 judges whether the feature unit section is a sudden action section or an action transition section (Step S2002).

When the feature unit section which is input is a sudden action section (Step S2002: Sudden action section), the section lengthening reference index calculation unit 207 sets a section of nine second unit sections in length, comprising the feature unit section and four second unit sections both before and after the feature unit section, as a reference section (Step S2003).

Next, the section lengthening reference index calculation unit 207 calculates a center of mass vector of frequency vectors (NF1-NF9) in the reference section, which are input from the frequency vector buffer 205, and sets the center of mass vector as a reference vector S (Step S2004).

Next, the section lengthening reference index calculation unit 207 calculates Euclidean distances D(S, NF1)–D(S, NF9) between the reference vector S and the frequency vectors (NF1-NF9) in the reference section, and sets a greatest among the Euclidean distances as a threshold value Rth (Step S2005).

When the feature unit section which is input is an action transition section (Step S2002: Action transition section), processing similar to in Steps S2003-S2005 is performed to calculate a first reference section, a first reference vector 51 and a first threshold value Rth1, and also similarly, a second reference section, a second reference vector S2 and a second threshold value Rth2 (Steps S2006-S2008).

Finally, the section lengthening reference index calculation unit 207 outputs a reference index calculated thereby to the interesting section extraction unit 208 (Step S2009).

<4-3. Processing for Interesting Section Extraction>

Figure 21:
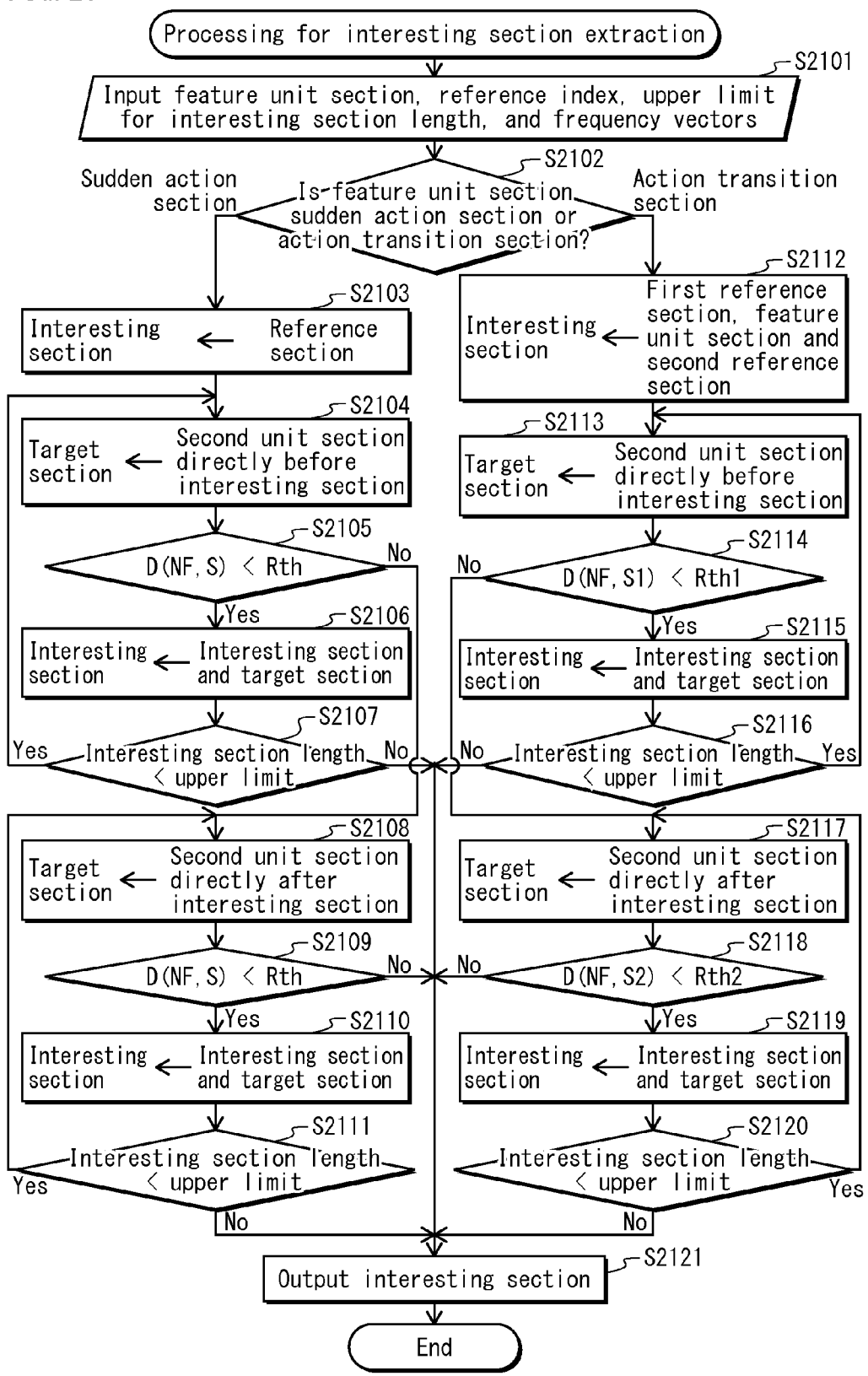
FIG. 21 is a flowchart illustrating processing for interesting section extraction.

FIG. 21 is a flowchart showing processing for interesting section extraction executed by the interesting section extraction unit 208. As illustrated in FIG. 20, the feature unit section detected by the feature unit section detection unit 206, the reference index calculated by the section lengthening reference index calculation unit 207, the upper limit for interesting section length acquired by the user information acquisition unit 210 and the frequency vectors stored in the frequency vector buffer 205 are used as input for the processing for interesting section extraction (Step S2101).

The interesting section extraction unit 208 judges whether the feature unit section input from the feature unit section detection unit 206 is a sudden action section or an action transition section (Step S2102).

The following explains in detail processing when the feature unit section is a sudden action section (Step S2101: Sudden action section), and differences in processing when the feature unit section is an action transition section (Step S2101: Action transition section).

First, the interesting section extraction unit 208 sets the reference section input from the section lengthening reference index calculation unit 207 as an initial value for an interesting section (Step S2103).

Next, the interesting section extraction unit 208 executes processing in Steps S2104-S2107 with respect to the initial value of the interesting section set in Step S2103, thus performing processing for section lengthening in the reverse direction along the time axis of the audio signal.

The interesting section extraction unit 208 sets a second unit section directly before the interesting section along the time axis of the audio signal as a target section (Step S2104).

The interesting section extraction unit 208 calculates a Euclidean distance D(NF, S) between a frequency vector NF for the target section, input from the frequency vector buffer 205, and the reference vector S input from the section lengthening reference index calculation unit 207. The interesting section extraction unit 208 performs a comparison of the Euclidean distance D(NF, S) and the threshold value Rth input from the section lengthening reference index calculation unit 207 (Step S2105).

When the Euclidean distance D(NF, S) is shorter the threshold value Rth (Step S2105: Yes), the interesting section extraction unit 208 updates the interesting section to include the target section (Step S2106).

Once the interesting section extraction unit 208 has updated the interesting section, the interesting section extraction unit 208 performs a comparison of length of the interesting section to the upper limit le for interesting section length input from the user information acquisition unit 210 (Step S2107). When length of the interesting section is shorter than the upper limit le (Step S2107: Yes), processing is repeated from Step S2104, and when length of the interesting section is equal to or longer than the upper limit le (Step S2107: No), the interesting section extraction unit 208 outputs interesting section data to the interesting section storage device 105 indicating the interesting section calculated at the current time (Step S2121).

When the Euclidean distance D(NF, S) is equal to or greater than the threshold value Rth (Step S2105: No), the interesting section extraction unit 207 ends processing for section lengthening in the reverse direction along the time axis of the audio signal and proceeds to Steps S2108-S2111 to perform processing for section lengthening in the forward direction along the time axis of the audio signal.

The processing for section lengthening in the forward direction only differs from the processing for section lengthening in the reverse direction in terms that a second unit section directly after the interesting section is set as a target section in Step S2108. Therefore, explanation of the processing for section lengthening in the forward direction is omitted.

The interesting section extraction unit 208 outputs interesting section data to the interesting section storage device 105 indicating the interesting section once the processing for section lengthening in the reverse direction and the processing for section lengthening in the forward direction end (Step S2121).

The following explains differences in processing when the feature unit section input from the feature unit section detection unit 206 is an action transition section (Step S2101: Action transition section), compared to processing when the feature unit section is a sudden action section.

As explained below, there are three differences when the feature unit section is an action transition section compared to when the feature unit section is a sudden action section.

(1) A section from a start point of the first reference section until an end point of the second reference section input from the section lengthening reference index calculation unit 207 is set as an initial value for the interesting section (Step S2112).

(2) The first reference vector 51 and the first threshold value Rth1 are used in processing for section lengthening in the reverse direction along the time axis (Step S2114).

(3) The second reference vector S2 and the second threshold value Rth2 are used in processing for section lengthening in the forward direction along the time axis (Step S2118).

The interesting section extraction unit 208 extracts the interesting section through execution of the processing described above.

5. Summary

As described above, the audio processing device 104 relating to the present embodiment, for each unit section of an audio signal included in a video file, calculates a feature variation value based on temporal variation of vectors (feature vectors, likelihood vectors, frequency vectors and dominant vectors) expressing features of the audio signal. The audio processing device 104 judges whether the unit section is a feature unit section based on a result of comparison of a threshold value and the feature variation value.

Through the configuration described above, the audio processing device 104 can detect a feature unit section which includes a variation point along the time axis of the features of the audio signal, for example due to a sudden action or action transition, and the audio processing device 104 can extract an interesting section using the feature unit section candidate which is detected.

6-1. Modified Examples

The audio processing device relating to the present invention was explained in accordance with the above embodiment, but the present invention is not limited to the above embodiment. The following explains various modified examples which are also included within the scope of the present invention.

(1) In the above embodiment, the audio processing device was explained as a configuration element provided in a video editing apparatus, but alternatively the audio processing device may be provided as a configuration element in an audio editing apparatus. Further alternatively, the audio processing device may be provided as a configuration element in an image display apparatus which acquires a video file including an audio signal from an external device, and outputs, as a thumbnail image, image data corresponding to a predetermined point in a feature unit section resulting from extraction.

A standard for selecting the predetermined point in the feature unit section may for example be selecting a point during the feature unit section at which a ratio of time from an end point of the feature unit section relative to time from a start point of the feature unit section is equal to a ratio of, among unit sections included in the time window used for calculation of the feature variation value, a number of the unit sections before the feature unit section relative to a number of the unit sections after the feature unit section. Alternatively, the predetermined point may be selected to be a fixed point such as a start, end or center point of the feature unit section.

(2) In the above embodiment, the video editing apparatus may also have a function of recording a plurality of extracted interesting sections to an internal recording device or an external recording medium, according to for example a playback order or an order in which AV contents were captured. When performing the above function, the AV contents corresponding to the interesting sections may be AV contents extracted from a plurality of files. Also, when recording a plurality of pieces of data corresponding to the plurality of interesting sections, the interesting sections may be combined during recording into a digest in order of feature unit sections corresponding thereto. During the above, if there is an overlapping section in which two adjacent interesting sections overlap, the interesting sections may be combined so that the overlapping section is not repeated during in the digest.

(3) In the above embodiment, the video file is acquired from a recording medium, but the video file may alternatively be acquired by a different method. For example, the video file may alternatively be acquired from a wireless or wired broadcast or network. Further alternatively, the audio processing device may include an audio input device such as a microphone, and feature unit sections may be extracted from an audio signal input via the audio input device.

(4) In the above embodiment, the likelihood vector buffer, the frequency vector buffer, the dominant vector buffer, the Anchor Model accumulation unit and the representative dominant vector accumulation unit are each configured as part of the memory, however so long as each of the above elements is configured as a storage device which is readable by the audio processing device, the above elements are not limited to being configured as part of the memory. For example, each of the above elements may alternatively be configured as a hard disk, a floppy disk, or an external storage device connected to the audio processing device.

(5) In regards to the audio data stored in the audio data accumulation device in the above embodiment, new audio data may be appropriately added to the audio data stored in the audio data accumulation device, and alternatively the audio data of the video stored in the content storage device may also be stored in the audio data accumulation device.

When new audio data is added, the Anchor Model creation device 107 may create new Anchor Models.

(6) In the above embodiment, an example was explained where from the audio dated accumulated in advance in the audio data accumulation device, Anchor Models $A_r$ are created (using so called unsupervised Anchor Model creation) for each of the sound pieces of various types which are categorized using clustering. However, the method of Anchor Model creation is not limited to the above. For example, for audio data accumulated in the audio data accumulation device, a user may select pieces of audio data corresponding to the sound pieces and give categorizing labels to each of the pieces of audio data. Pieces of audio data having the same categorizing label may then be used to create the Anchor Model for the corresponding sound piece (using so called supervised Anchor Model creation).

(7) In the above embodiment, lengths of the first unit section and the second unit section are merely an example thereof. Lengths of the first unit section and the second unit section may be different to in the above embodiment, so long as the second unit section is longer than the first unit section. Preferably, length of the second unit section should be a multiple of length of the first unit section.

(8) In the above embodiment, MFCC is used for the feature vector, but so long as features of the audio signal in the first unit section are expressed by a feature amount, the feature amount is not limited to using MFCC. For example, alternatively a frequency characteristic of the audio signal such as a power spectrum or a time series of amplitude of the audio signal may be used as the feature amount.

In the above embodiment, a 26-dimension MFCC is used due to preferable results being achieved in testing when using 26 dimensions, however the feature vector in the present invention is not limited to having 26 dimensions.

(9) In the above embodiment, the frequency vector of the second unit section is a vector having as components thereof, normalized cumulative likelihoods of each component of the likelihood vectors in the second unit section. However, so long as the frequency vector expresses a feature of the audio signal in a unit section and in particular is able to identify frequently occurring sounds components, the frequency vector may alternatively be a vector having components other than the normalized cumulative likelihoods. For example, alternatively a cumulative likelihood may be calculated for each component of the likelihood vectors in the unit section, and the frequency vector may be a normalized vector of cumulative likelihoods corresponding to only a highest K Anchor Models (K is a value greater than 1, for example 10) in terms of cumulative likelihood. Alternatively, the frequency vector may not normalize cumulative likelihood, and may instead be a vector having the cumulative likelihoods as components thereof. Further alternatively, the frequency vector may be a vector having average values of the likelihoods as components thereof.

(10) In the above embodiment, in generating the dominant vectors, average values of all the frequency vectors are calculated for each component, and the dominant vector for each frequency vector is a vector in which each component of the frequency vector which is lower than the corresponding average value is set to 0. However, the dominant vectors are not limited to the above. So long as each dominant vector is a vector that accentuates magnitude of each component of the corresponding frequency vector so that differences between each of the frequency vectors can be easily identified, the dominant vector may be a different vector. For example the dominant vector may be a vector that normalizes an exponential value of each component of the corresponding frequency vector, where the exponential value has an exponent which is natural number no less than 2.

(11) In the above embodiment, the feature variation calculation sub-unit 303 calculates the feature variation value using cosine degrees of similarity between the dominant vectors D included in the time window. However, the method of calculating the feature variation value is not limited to the above. The feature variation value quantifies temporal variation of features of the audio signal. In particular, so long as degrees of similarity (dissimilarity) between the features in a section which is a target and the features in sections included in the time window other than the section which is the target can be calculated, a Euclidean distance or a correlation coefficient may be used instead. If a Euclidean distance is used for the feature variation value, the feature variation value expresses a degree of dissimilarity. Therefore, a second unit section in which the feature variation value exceeds a threshold value should be detected as a feature unit section. Furthermore, the feature variation value may be a sum total of calculated degrees of similarity, or alternatively may be a normalized value of the sum total of calculated degrees of similarity.

(12) In the above embodiment, the time window used in calculation of the feature variation value is a section continuing for N consecutive second unit sections from the second unit section which is the target, however the time window is not limited to being determined as described above. For example, alternatively the time window may be a section including the second unit section which is the target and N−1 second unit sections occurring before the second unit section which is the target. Alternatively, the time window may be a section including a predetermined number of second unit sections both before and after the second unit section which is the target.

Preferably the feature unit section candidate judgment sub-unit 304 should change the judgment standard for judging between a sudden action and an action transition in accordance with the method used to determine the time window. Specifically, when the time window includes a section before the second unit section which is the target, a difference between a feature variation value of the feature unit section candidate and a feature variation value of a second unit section directly after the feature unit section candidate should be used in detection. On the other hand, when the time window includes a section after the second unit section which is the target, a difference between the feature variation value of the feature unit section candidate and a feature variation value of a second unit section directly before the feature unit section candidate should be used in detection.

In the above embodiment, the number of second unit sections included in the time window (length of the time window) is just one example thereof, and alternatively a different number of second unit sections may be included in the time window.

(13) In the above embodiment, the feature unit section judgment sub-unit 305 calculates degrees of similarity between the dominant vector D of the feature unit section candidate and the representative dominant vectors DD. The above is just one example of a method for selecting a dominant vector D for use in calculating degrees of similarity and the method is not limited to the above.

For example, when the feature unit section candidate is a candidate for an action transition section, the feature unit section judgment sub-unit 305 may select a dominant vector from both before and after the feature unit section candidate. Through the above configuration, the feature unit section judgment sub-unit 305 may judge the feature unit section candidate to be the start of an action if the dominant vector before the feature unit section candidate is similar to the representative dominant vector. On the other hand, feature unit section judgment sub-unit 305 may judge the feature unit section candidate to be the end of an action if the dominant vector after the feature unit section candidate is similar to the representative dominant vector. Thus, the feature unit section judgment sub-unit 305 is able to differentiate between whether the feature unit section candidate is the start or the end of an action. In other words, the feature unit section judgment sub-unit 305 is able to judge between a feature unit section in which a subject in the video file starts an action, a feature unit section in which a subject in the video file ends an action, and a feature unit section in which a subject in the video file ends an action and subsequently starts a different action.

(14) In the above embodiment, the processing performed by the section lengthening reference index calculation unit 207 to calculate the reference index (reference section, reference vector and threshold value) is just one example thereof, and the processing is not limited to the above.

For example, alternatively the section lengthening reference index calculation unit 207 may only calculate the first reference section, the first reference vector and the first threshold value Rth1 described in the above embodiment, or may only calculate the second reference section, the second reference vector S2 and the second threshold value Rth2 described in the above embodiment. The section lengthening reference index calculation unit 207 may also use a plurality of different methods for calculating the reference index, and selectively use the methods in accordance for example with whether the feature unit section is for the start of an action or the end of an action as described above in modified example (13).

Furthermore, the section lengthening reference index calculation unit 207 may alternatively calculate the reference vector and the threshold value using frequency vectors NF of second units sections included in the reference section, other than the second unit section which is the feature unit section. If the threshold value is calculated as described above, the threshold value is smaller (greatest Euclidean distance between the reference vector and the frequency vectors is shorter) than if the feature unit section is included in calculation. A consequence of the above is extraction of a shorter interesting section.

On the other hand, in addition to frequency vectors of second unit sections included in the reference section, the section lengthening reference index calculation unit 207 may also use the frequency vector of the second unit section which is the feature unit section in calculation of the reference vector and the threshold value. If the threshold value is calculated as described above, the threshold value is greater (greatest Euclidean distance between the reference vector and the frequency vectors is longer) than if the feature unit section is not included in calculation. A consequence of the above is extraction of a longer interesting section.

(15) In the above embodiment, the reference vector was explained as a center of mass vector of the frequency vectors of the second unit sections included in the reference section. However, the reference vector is not limited to the above. For example, alternatively the reference vector may be a vector having as components, median values of each component of the frequency vectors of the second units sections included in the reference section. Further alternatively, if a large number of second unit sections, such as 100 second unit sections, are included in the reference section, the reference vector may be a vector having as components, modal values of each component of the frequency vectors. In another example, the reference vector may be a vector which minimizes a total of Euclidean distances between the frequency vectors of the second unit sections included in the reference section and the reference vector.

(16) In the above embodiment, one example is given of an interesting section extraction method, but the interesting section extraction method is not limited to that described in the above embodiment. The interesting section extraction method may be different, so long as the reference index (reference sections, reference vectors and threshold values) is used to perform processing for section lengthening in both forward and reverse directions along the time axis. For example, an interesting section extracted for an action transition section using the first reference section, the first reference vector and the first threshold value and an interesting section extracted for the action transition section using the second reference section, the second reference vector and the second threshold value, may alternatively be extracted as separate interesting sections.

(17) In the above embodiment, the interesting section extraction unit 208 judges that the target section should be included in the interesting section when the Euclidean distance between the frequency vector in the target section and the reference vector S does not exceed the threshold value Rth, and length of the interesting section is shorter than the upper limit le for interesting section length which set in advance. The above is in order to prevent the interesting section from becoming longer than a certain fixed length, but if there is no limitation on interesting section length, the target section may be included in the interesting section without performing processing to compare length of the interesting section to the upper limit le.

In the above embodiment, a configuration is explained wherein the processing for section lengthening is first performed in the reverse direction along the time axis and subsequently in the forward direction along the time axis, but alternatively the present invention may have a configuration such as explained below.

For example, the interesting section extraction unit 208 may first perform processing for section lengthening in the forward direction along the time axis, and subsequently in the reverse direction along the time axis. Alternatively, the interesting section extraction unit 208 may lengthen the interesting section by second unit sections alternately in the reverse and forward directions along the time axis. If the interesting section is lengthened in alternate directions, possible lengthening methods include alternating after each second unit section, or alternating after a fixed number of second unit sections (five for example).

(18) In the above embodiment, the interesting section extraction unit 208 judges whether to include the target section in the interesting section in accordance with a judgment of whether the Euclidean distance between the frequency vector in the target section and the reference vector exceeds the threshold value Rth. However, the Euclidean distance is not required to be used in the above judgment, so long as the judgment pertains to whether similarity between the frequency vector and the reference vector is at least some fixed value.

For example, in an alternative configuration, Kullback-Leibler (KL) divergence (also referred to as relative entropy) in both directions between mixture distributions for the reference vector and the frequency vector may be used as distance when extracting the interesting section, the mixture distributions for the reference vector and the frequency vector having as weights, probability distributions defined by the Anchor Models corresponding to each of the components of the reference vector and the frequency vector respectively. In the above configuration, the threshold value Rth should also be calculated using KL divergence.

KL divergence is commonly known in probability theory and information theory as a measure of difference between two probability functions. A KL distance between the frequency vector and the reference vector relating to the embodiment of the present invention can be calculated as follows.

First, one mixture distribution is configured using the frequency vector NF and the probability functions defined by each of the Anchor Models. Specifically, a mixture distribution $G_{NF}$ can be calculated using MATH 3 shown below, by taking the frequency vector $NF=(\alpha_1, \ldots, \alpha_r, \ldots, \alpha_{1024})$ to be the weight for the probability distributions $(b_{A1}, \ldots, b_{Ar}, \ldots, b_{A1024})$ defined by the Anchor Models.

$$G_{NF} = \sum_{i=1}^{1024} \alpha_i b_{Ai} \quad \text{[MATH 3]}$$

A mixture distribution for the reference vector is configured in the same way as above. In other words, a mixture distribution $G_S$ can be calculated using MATH 4 shown below, by taking the reference vector $S=(\mu_1, \ldots, \mu_r, \ldots, \mu_{1024})$ to be the weight for the probability distributions $(b_{A1}, \ldots, b_{Ar}, \ldots, b_{A1024})$ defined by the Anchor Models.

$$G_S = \sum_{i=1}^{1024} \mu_i b_{Ai} \quad \text{[MATH 4]}$$

Next, the mixture distribution $G_{NF}$ and the mixture distribution $G_S$ can be used to calculate KL divergence from the mixed distribution $G_{NF}$ to the mixed distribution $G_S$ using MATH 5 shown below.

$$D_{KL}(G_{NF} \mid G_S) = \int_X G_{NF}(x) \log \frac{G_{NF}(x)}{G_S(x)} dx \quad \text{[MATH 5]}$$

In MATH 5, X is a set of all arguments of the mixture distribution $G_{NF}$ and the mixture distribution $G_S$.

KL divergence from the mixed distribution $G_S$ to the mixed distribution $G_{NF}$ can be calculated using MATH 6 shown below.

$$D_{KL}(G_S \mid G_{NF}) = \int_X G_S(x) \log \frac{G_S(x)}{G_{NF}(x)} dx \quad \text{[MATH 6]}$$

MATH 5 and MATH 6 are non-symmetrical, hence KL distance between the two probability distributions can be calculated as in MATH 7 shown below.

$$\text{Dist}(G_{NF}, G_S) = \frac{D_{KL}(G_{NF} \mid G_S) + D_{KL}(G_S \mid G_{NF})}{2} \quad \text{[MATH 7]}$$

Instead of the Euclidean distance indicated in the above embodiment, the KL distance indicated in MATH 7 may be used when performing the judgment as to whether to include the target section in the interesting section. In the above situation, instead of using Euclidean distance for the threshold value Rth, a KL distance should be used which, for the frequency vectors of the second unit sections included in the reference section, is a greatest KL distance between any one of the frequency vectors and the reference vector.

In another example of a method which does not use Euclidean distance, correlation (cosine degree of similarity, Pearson's coefficient or the like) may be calculated between the reference vector and the frequency vector of the target section. In the above method, the target section may be included in the interesting section when the correlation is at least equal to a fixed value (greater than or equal to 0.6 for example).

(19) In the embodiment, the upper limit le for interesting section length is indicated by a user via the interface device 110, but the above is not a limitation on the present invention. Alternatively, the upper limit le for interesting section length may be indicated by a system developer once an application is determined.

(20) In the above embodiment, the audio data used to create the initial representative dominant vectors DD is in the form of audio signals categorized in advance for representative group of human actions. Specifically, the sounds of the representative human actions are sounds such as laughing, applause, gunfire and cheering which occur due to human actions.

(21) In the above embodiment, the feature unit section judgment sub-unit 305 calculates degrees of similarity between the dominant vector D of the feature unit section candidate and the representative dominant vectors DD, and detects the feature unit section candidate to be a feature unit section if the degree of similarity is high. However, the method of detecting feature unit sections from among feature unit section candidates is not limited to the above. For example, external information to be used in detecting feature units sections may alternatively be acquired from an external device, and feature unit sections may be detected from among feature unit section candidates based on the external information.

The external information may for example be face clustering information categorizing people appearing in a video file, which can be used to judge a section in which an identified person appears. Through the above, a feature unit section candidate in which the identified person is judged to appear can be detected to be a feature unit section based on the face clustering information.

Alternatively, the external information may be information for judging a section of a video file in which an operation such as zooming or panning is performed. Further alternatively, the external information may be chapter information or the like created by indexing of the video file by another device.

(22) Alternatively, the video editing apparatus relating to the above embodiment may be connected to a network and the present invention may be implemented as a video editing system including the video editing apparatus and at least one terminal attached thereto through the network.

In a video editing system such as described above, one terminal may for example transmit a video file to the video editing apparatus and the video editing apparatus may extract interesting sections from the video file and subsequently transmit the interesting sections to the terminal.

Through the above configuration, even a terminal which does not have a video editing functionality is able to play back a video on which editing (extraction of interesting sections) has been performed.

Alternatively, in the video editing system, functions of the video editing apparatus may be divided up and the terminal may be provided with a portion of the divided up functions. In the above configuration, the terminal which has the portion of the divided up functions is referred to as a client and a device provided with the remaining functions is referred to as a server.

Figure 22:
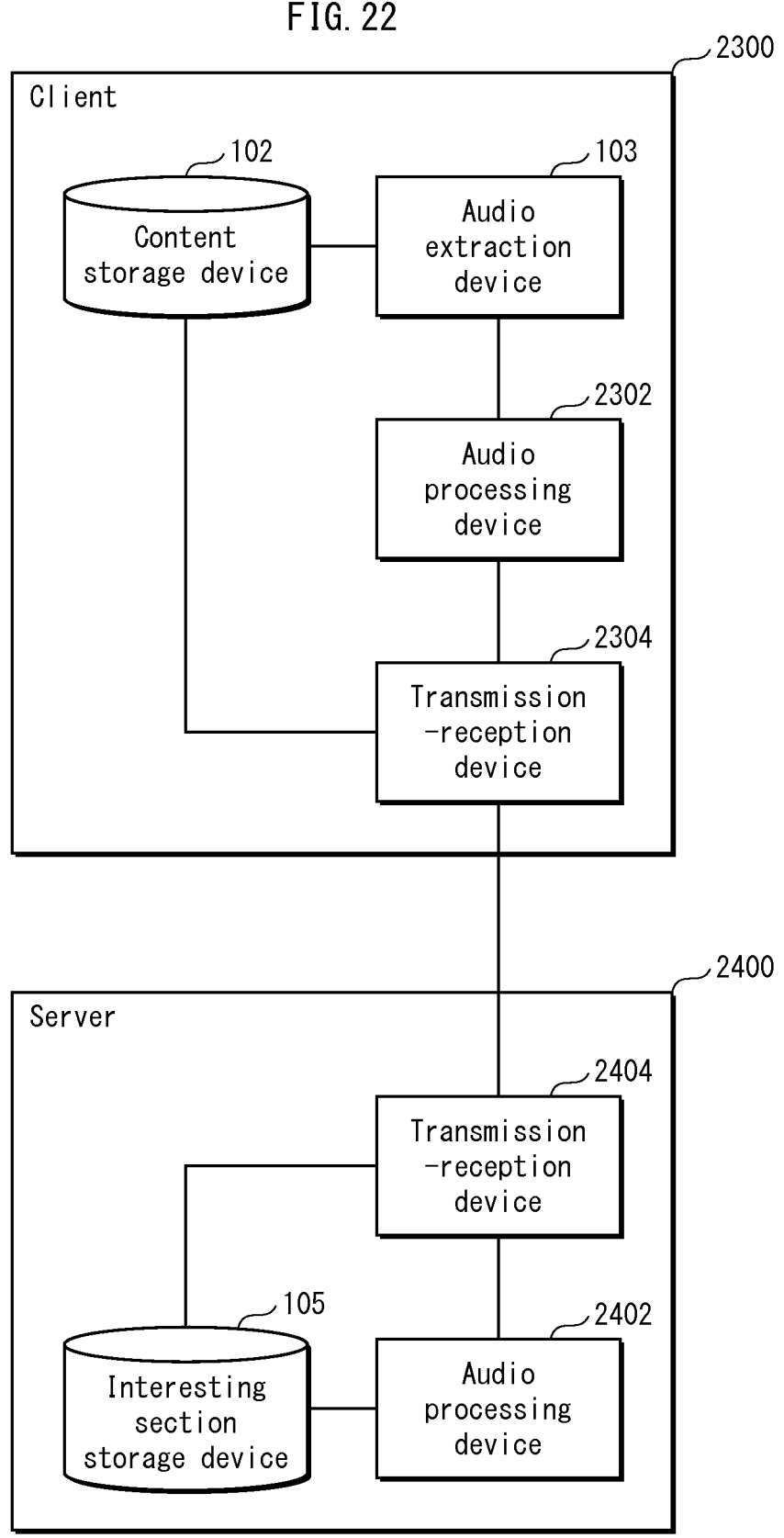
FIG. 22 is a block diagram illustrating an example of configuration of a video editing system.
Figure 23:
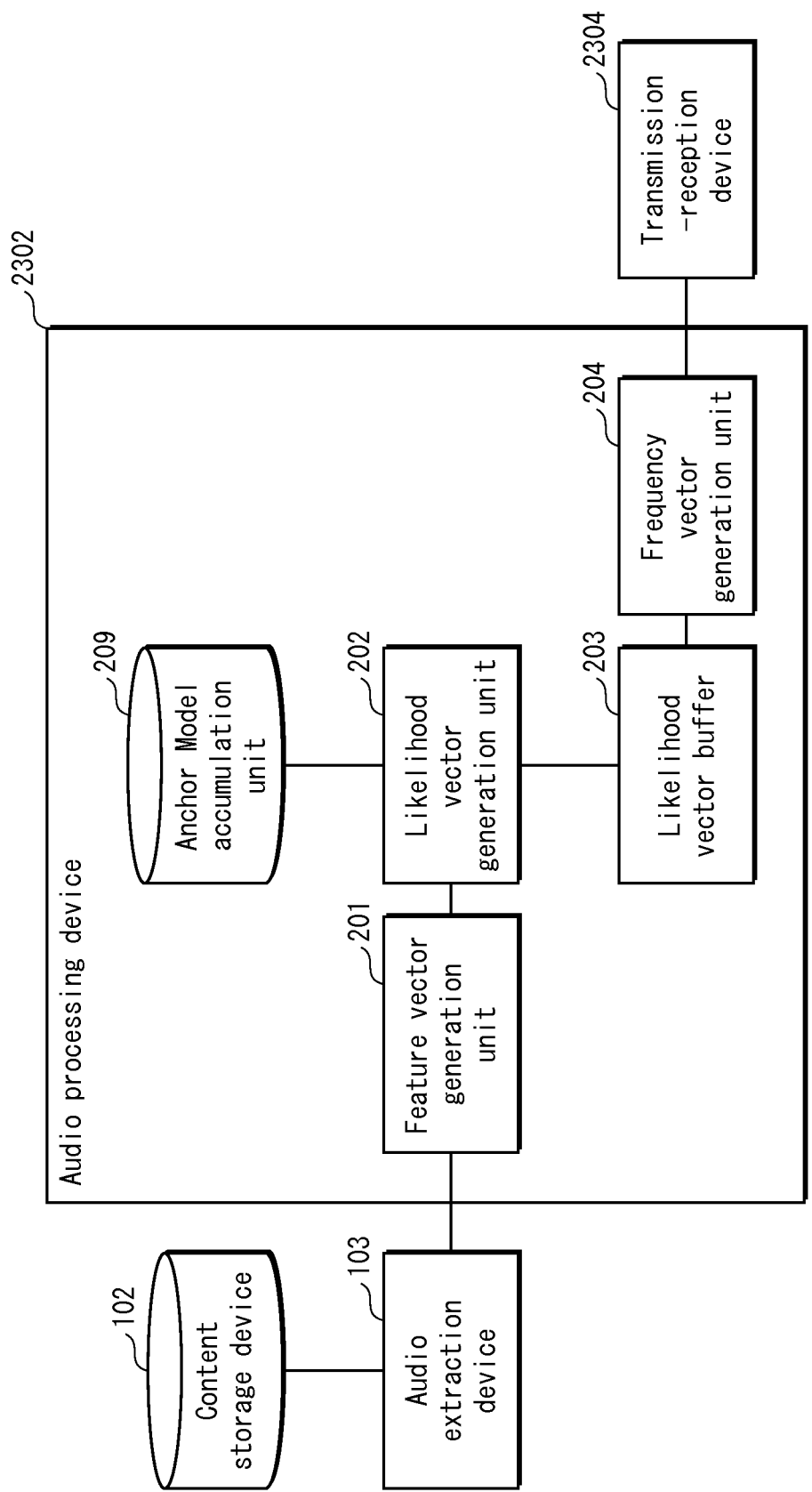
FIG. 23 is a block diagram illustrating an example of configuration of a client in the video editing system.
Figure 24:
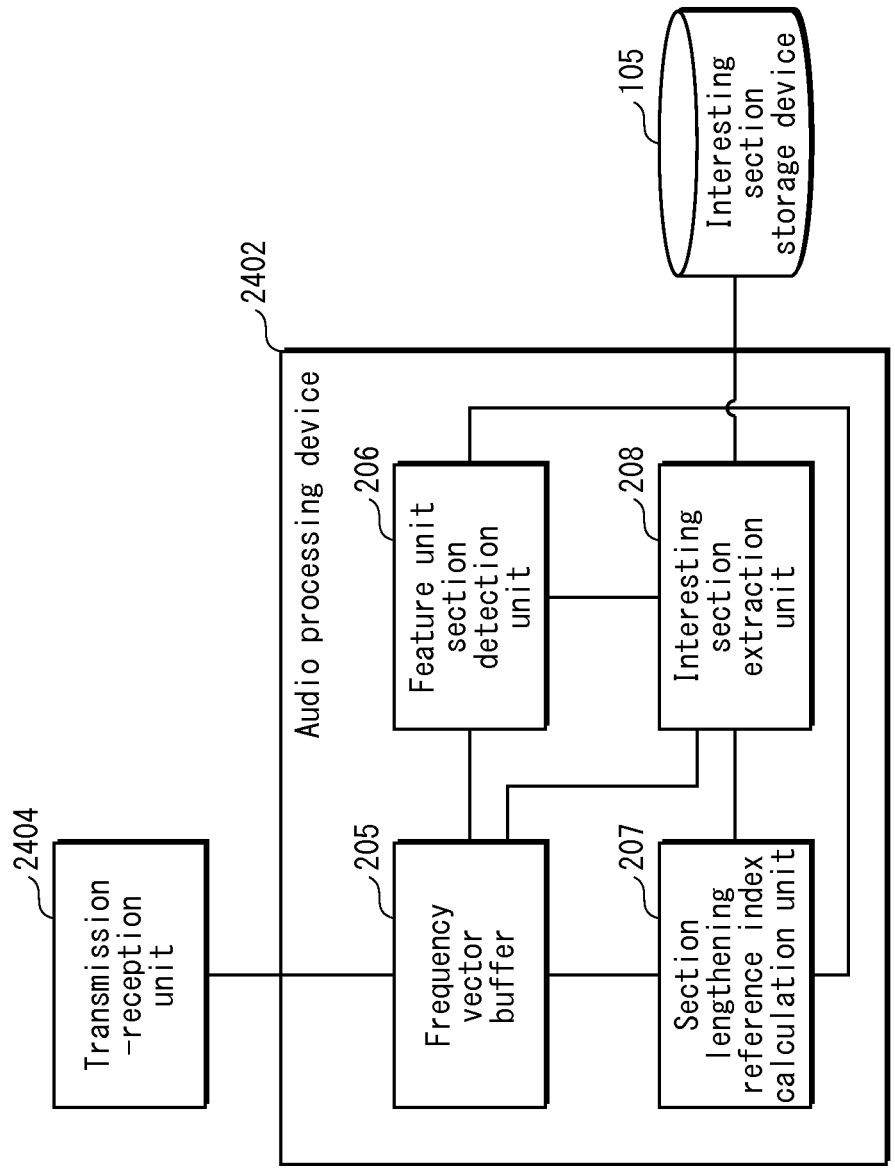
FIG. 24 is a block diagram illustrating an example of configuration of a server in the video editing system.

FIGS. 22-24 illustrate one example of configuration of a video editing system in which the functions of the video editing apparatus are divided up.

As illustrated in FIG. 22, the video editing system consists of a client 2300 and a server 2400.

The client 2300 includes a content storage device 102, an audio extraction device 103, an audio processing device 2302 and a transmission-reception device 2304.

The content storage device 102 and the audio extraction device 103 are identical to the content storage device 102 and the audio extraction device 103 in the above embodiment.

The audio processing device 2302 has a portion of the functions of the audio processing device 104 in the above embodiment. Specifically, the audio processing device 2302 has the function of generating frequency vectors using an audio signal.

The transmission-reception device 2304 has a function of transmitting the frequency vectors generated by the audio processing device 2302 to the server 2400 and a function of receiving interesting section data from the server 2400.

The server 2400 includes an interesting section storage device 105, an audio processing device 2402 and a transmission-reception device 2404.

The interesting section storage device 105 is identical to the interesting section storage device 105 in the above embodiment.

The audio processing device 2402 has a portion of the functions of the audio processing device 104 in the above embodiment. Specifically, the audio processing device 2402 has the function of generating interesting section data using frequency vectors.

The transmission-reception device 2404 has a function of receiving the frequency vectors from the client 2300 and a function of transmitting the interesting section data stored in the interesting section storage device 105 to the client 2300.

FIG. 23 illustrates one example of functional configuration of the audio processing device 2302 included in the client 2300. As illustrated in FIG. 23, the audio processing device 2302 includes a feature vector generation unit 201, a likelihood vector generation unit 202, a likelihood vector buffer 203, a frequency vector generation unit 204 and an Anchor Model accumulation unit 209. Each of the above configuration elements is identical to the configuration element labeled with the same reference sign in the above embodiment.

FIG. 24 illustrates one example of functional configuration of the audio processing device 2402 included in the server 2400. As illustrated in FIG. 24, the audio processing device 2402 includes a frequency vector buffer 205, a feature unit section detection unit 206, a section lengthening reference index calculation unit 207 and an interesting section extraction unit 208. Each of the above configuration elements is identical to the configuration element labeled with the same reference sign in the above embodiment.

Through the above configuration, transmissions within the video editing system are limited to the frequency vectors and the interesting section data. Consequently, a transmission amount in the video editing system can be reduced compared to when the video file is transmitted without dividing up the video editing apparatus.

Alternatively, the server in the video editing system may include a storage unit which stores therein interesting sections in the video file. The server may receive the interesting sections in the video file from the client, store the interesting sections therein and transmit the interesting sections to another terminal connected through the network.

Through the above configuration, the interesting sections can be shared with a larger number of terminals.

(23) Alternatively, the above embodiment and modified examples may be partially combined with one another.

(24) Alternatively, a control program consisting of a program code written in a mechanical or high-level language, which causes a processor and circuits connected thereto in an audio processing device to execute the processing for feature unit section detection, the processing for reference index calculation and the processing for interesting section extraction in the above embodiment, may be recorded on a recording medium or distributed through communication channels or the like. The recording medium may for example be an IC card, a hard disk, an optical disk, a floppy disk, a ROM, a flash memory or the like. The distributed control program may be provided for use stored in a memory or the like which is readable by a processor, and through execution of the control program by the processor, functions such as described in the above embodiment and modified examples may be implemented. The processor may directly execute the control program, or may alternatively execute the control program after compiling or through an interpreter.

(25) Each of the functional configuration elements described in the above embodiment (for example the feature unit section detection unit, the section lengthening reference index calculation unit and the interesting section extraction unit) may alternatively be implemented by a circuit executing the same functions thereas or by one or more processors executing a program. Also, the audio processing device in the above embodiment may alternatively be configured as an IC, LSI or other integrated circuit package. The above package may be provided for use by incorporation in various devices, through which the various devices implement functions such as described in the above embodiment.

Each functional block such as the feature unit section detection unit, the section lengthening reference index calculation unit and the interesting section extraction unit may typically be implemented by an LSI which is an integrated circuit. Alternatively, the functional blocks may be combined in part or in whole onto a single chip. The above refers to LSI, but according to the degree of integration the above circuit integration may alternatively be referred to as IC, system LSI, super LSI, or ultra LSI. The method of circuit integration is not limited to LSI, and alternatively may be implemented by a dedicated circuit or a general processor. An FPGA (Field Programmable Gate Array), which is programmable after the LSI is manufactured, or a reconfigurable processor, which allows for reconfiguration of the connection and setting of circuit cells inside the LSI, may alternatively be used. Furthermore, if technology for forming integrated circuits that replaces LSI were to emerge, owing to advances in semiconductor technology or to another derivative technology, the integration of functional blocks may naturally be accomplished using such technology. Application of biotechnology is also possible.

6-2. Supplementary Explanation

The following explains an audio processing device as one aspect of the present invention, and also modified examples and effects thereof.

(A) An audio processing device relating to one aspect of the present invention comprises: a feature data generation unit configured to generate, for each unit section of an audio signal, section feature data expressing features of the audio signal in the unit section; a feature variation calculation unit configured to calculate, for each unit section of the audio signal, a feature variation value which quantifies temporal variation of the features of the audio signal in the unit section, by setting the unit section as a target section and using section feature data of a plurality of unit sections close to the target section; and a section judgment unit configured to judge, for each unit section of the audio signal, whether the unit section is a feature unit section including a variation point of the features of the audio signal, based on a result of comparison of a threshold value and the feature variation value of the unit section.

Through the above configuration, by calculating for each unit section (second unit section) the value which quantifies temporal variation of features of the audio signal and comparing the value and the threshold value, the audio processing device relating to the present invention can detect the feature unit section without relying on continuity of audio features.

(B) In the audio processing device in section (A) above, the feature variation calculation unit may calculate the feature variation value using a degree of similarity between section feature data of the target section and section feature data of a unit section, other than the target section, which is close to the target section.

Through the above configuration, the audio processing device is able to calculate the feature variation value using the degree of similarity between the target section and the unit section (second unit section) which is close to the target section.

(C) In the audio processing device in section (B) above, the threshold value may be a first threshold value, the feature variation calculation unit may calculate the feature variation value using a degree of similarity between the section feature data of the target section and section feature data of a unit section which is consecutive with the target section, the section judgment unit may judge, for each unit section of the audio signal, whether the unit section is a feature unit section candidate, based on the result of comparison of the first threshold value and the feature variation value of the unit section, and the section judgment unit may judge whether the feature unit section candidate is the feature unit section, based on a result of comparison of a second threshold value and a rate of change of the feature variation value of the feature unit section candidate.

Through the above configuration, the audio processing device uses degrees of similarity between the unit section which is the target section and each of a predetermined number of unit sections which are consecutive therewith in order to calculate the feature variation value, thus rate of change (gradient) of the feature variation value of the unit section which is the target section expresses rate of change of the features of the audio signal. For a sudden action section, variation of the features only occurs during a single unit section and thus the feature variation value changes sharply. For an action transition section, features of the audio signal after the action transition gradually mix with features of the audio signal before the action transition, and thus the feature variation value changes gradually. Consequently, differentiation between whether a feature unit section which is a target for detection is a sudden action section or an action transition section, is possible through use of the rate of change of the feature variation value of the unit section which is the target section.

(D) In the audio processing device in section (A) above, the section feature data may be a vector which accentuates magnitude of each component of a vector expressing the features of the audio signal in the unit section.

Through the above configuration, the audio processing device calculates the feature variation value using dominant vectors which accentuate differences between unit sections of the audio signal, thus the feature variation value also accentuates temporal variation of the features of the audio signal. Consequently, the audio processing device can detect the feature unit section even from a small variation, thus improving ability of the audio processing device to detect the feature unit section.

(E) The audio processing device in section (A) above may further comprise a representative feature data storage unit that stores therein in advance, representative feature data which is used as a reference when judging, for each unit section of the audio signal, whether the unit section is the feature unit section, wherein the section judgment unit may include a candidate judgment sub-unit configured to judge, for each unit section of the audio signal, whether the unit section is a feature unit section candidate, based on the result of comparison of the threshold value and the feature variation value of the unit section, and the section judgment unit may judge the feature unit section candidate to be the feature unit section when section feature data of a unit section close to the feature unit section candidate is similar to the representative feature data.

Through the above configuration, feature unit sections which are not required by the user can be excluded, thus allowing extraction of only feature unit sections which are desired by the user.

(F) In the audio processing device in section (E) above, the section judgment unit may judge the feature unit section candidate to be the feature unit section when section feature data of a unit section before the feature unit section candidate or section feature data of a unit section after the feature unit section candidate is similar to the representative feature data.

Through the above configuration, the audio processing device is able to judge which out of a section before the feature unit section and a section after the feature unit section in the audio signal is a feature section. In other words, the audio processing device, when detecting the feature unit section, is able to differentiate between whether the feature unit section corresponds to the start of an action or the end of an action.

(G) The audio processing device in section (E) above may further comprise: a user information acquisition unit configured to acquire an evaluation of the feature unit section by a user; and a representative feature update unit configured to, based on the evaluation by the user, calculate new representative feature data using the section feature data of the unit section close to the feature unit section, and store the new representative feature data in the representative feature data storage unit.

Through the above configuration, the evaluation by the user can be used to influence detection of feature unit sections by the audio processing device, thus the audio processing device is able to detect feature unit sections which are appropriate for each individual user.

(H) The audio processing device in section (A) above may further comprise an acquisition unit configured to acquire external information which is used as a reference when judging, for each unit section of the audio signal, whether the unit section is the feature unit section, wherein the section judgment unit may include a candidate judgment sub-unit configured to judge, for each unit section of the audio signal, whether the unit section is a feature unit section candidate, based on the result of comparison of the threshold value and the feature variation value of the unit section, and the section judgment unit may judge whether the feature unit section candidate is the feature unit section based on the external information.

Through the above configuration, the external information (for example an indexing result or face clustering information from an external device) can be used to influence detection of feature unit sections by the audio processing device.

(I) In the audio processing device in section (H) above, the external information may be face clustering information usable for judging a section in which an identified person appears in an AV content corresponding to the audio signal, and the section judgment unit may judge the feature unit section candidate to be the feature unit section when judging, based on the face clustering information, that the feature unit section candidate corresponds to the section in which the identified person appears in the AV content.

Through the above configuration, face clustering information can be used to influence detection of feature unit sections by the audio processing device.

(J) The audio processing device in section (A) above may further comprise: a reference feature data calculation unit configured to calculate reference feature data using section feature data of a plurality of unit sections included in a reference section, which consists of a predetermined number of consecutive unit sections which are close to the feature unit section; and an interesting section extraction unit configured to extract as an interesting section, a plurality of consecutive unit sections which are close to the feature unit section and which each have section feature data similar to the reference feature data.

Through the above configuration, the audio processing device is able to automatically extract an interesting section using the feature unit section which is detected. An effect of the above is that burden on the user when extracting the interesting section is reduced.

(K) In the audio processing device in section (J) above, the reference section may include the feature unit section, and the interesting section extracted by the interesting section extraction unit may include the reference section.

Through the above configuration, the audio processing device is able to extract an appropriate interesting section for a feature unit section which is a sudden action section, by using a reference section which includes the feature unit section.

(L) In the audio processing device in section (J) above, the reference section may consist of a first reference section consisting of a predetermined number of consecutive unit sections directly before the feature unit section, and a second reference section consisting of a predetermined number of consecutive unit sections directly after the feature unit section, the reference feature data calculation unit may calculate as the reference feature data, first reference feature data of the first reference section and second reference feature data of the second reference section, the interesting section extraction unit may calculate: a first interesting section, inclusive of the first reference section, consisting of a plurality of unit sections which each have section feature data similar to the first reference feature data; and a second interesting section, inclusive of the second reference section, consisting of a plurality of unit sections which each have section feature data similar to the second reference feature data, and the interesting section extraction unit may extract as the interesting section, a section from a start point of the first interesting section to an end point of the second interesting section.

Through the above configuration, for a feature unit section which is an action transition section where the features of the audio signal change either side of the feature unit section, the audio processing device is able to extract an appropriate interesting section including the feature unit section by calculating different reference feature data for before and after the feature unit section.

(M) In the audio processing device in section (J) above, the reference section may consist of a first reference section consisting of a predetermined number of consecutive unit sections directly before the feature unit section, and a second reference section consisting of a predetermined number of consecutive unit sections directly after the feature unit section, the reference feature data calculation unit may calculate as the reference feature data, first reference feature data of the first reference section and second reference feature data of the second reference section, and the interesting section extraction unit may extract as the interesting section: a first interesting section, inclusive of the first reference section, consisting of a plurality of unit sections which each have section feature data similar to the first reference feature data; and a second interesting section, inclusive of the second reference section, consisting of a plurality of unit sections which each have section feature data similar to the second reference feature data.

Through the above configuration, for a feature unit section which is an action transition section where the features of the audio signal change either side of the feature unit section, the audio processing device is able to extract both an interesting section before the change of the features of the audio signal and an interesting section after the change of the features of the audio signal.

(N) In the audio processing device in section (A) above, each unit section may be a second unit section consisting of a plurality of first unit sections which are consecutive with one another, the audio processing device may further comprise: a model storage unit that stores therein in advance, probability models expressing features of each of a plurality of sound pieces of various types; and a likelihood vector generation unit configured to generate a likelihood vector for each first unit section using the probability models, the likelihood vector having as components, likelihoods of each sound piece with regards to the audio signal, and the section feature data generated for each second unit section may be a frequency vector which is generated using likelihood vectors of each first unit section included in the second unit section and which indicates appearance frequencies of the sound pieces.

Through the above configuration, based on the probability models which express the sound pieces, the audio processing device is able to generate likelihood vectors and frequency vectors which express an extent to which components of the sound pieces are included in each first unit section and each second unit section of the audio signal.

(O) The audio processing device in section (N) above may further comprise a feature vector generation unit configured to calculate for each first unit section, a feature vector which indicates a frequency characteristic of the audio signal, wherein the likelihood vector generation unit may generate the likelihood vector for the first unit section using the feature vector of the first unit section and the probability models.

Through the above configuration, the audio processing device is able to detect feature unit sections using the frequency characteristic of the audio signal.

(P) The audio processing device in section (A) above may further comprise a feature point extraction unit configured to extract as a feature point, a point in the feature unit section at which a ratio of time from an end point of the feature unit section relative to time from a start point of the feature unit section is equal to a ratio of, among the unit sections of which the section feature is used in calculation of the feature variation value of the feature unit section, a number of the unit sections before the feature unit section relative to a number of the unit sections after the feature unit section.

Through the above configuration, the audio processing device is able to automatically calculate feature points of the audio signal.

INDUSTRIAL APPLICABILITY

The audio processing device and the audio processing method relating to the present invention detect feature unit sections from an audio signal, such as from an AV content including indoor or outdoor sounds and voices, and thereby automatically extract interesting sections which are targets of interest for a user, allowing emphasized playback (trick playback or filter processing for example) or the like to be performed for the feature unit sections. The present invention may be used for example in an audio editing apparatus or a video editing apparatus.

REFERENCE SIGNS LIST 100 video editing apparatus
101 input device
102 content storage device
103 audio extraction device
104 audio processing device
105 interesting section storage device
106 output device
107 Anchor Model creation device
108 initial representative dominant vector creation device
109 audio data accumulation device
110 interface device
201 feature vector generation unit
202 likelihood vector generation unit
203 likelihood vector buffer
204 frequency vector generation unit
205 frequency vector buffer
206 feature unit section detection unit
207 section lengthening reference index calculation unit
208 interesting section extraction unit
209 Anchor Model accumulation unit
301 dominant vector generation sub-unit
302 dominant vector buffer
303 feature variation calculation sub-unit
304 feature unit section candidate judgment sub-unit
305 feature unit section judgment sub-unit
306 representative dominant vector update sub-unit
307 representative dominant vector accumulation sub-unit
401 feature vector generation unit
402 feature vector categorization unit
403 Anchor Model generation unit
501 feature vector generation unit
502 likelihood vector generation unit
503 likelihood vector buffer
504 frequency vector generation unit
505 frequency vector buffer
506 dominant vector generation unit
507 dominant vector buffer
508 initial representative dominant vector creation unit

The invention claimed is:

1. An audio processing device comprising:
a feature data generation unit configured to generate, for each unit section of an audio signal, section feature data expressing features of the audio signal in the unit section;
a feature variation calculation unit configured to calculate, for each unit section of the audio signal, a feature variation value which quantifies temporal variation of the features of the audio signal in the unit section, by setting the unit section as a target section and using section feature data of a plurality of unit sections close to the target section; and
a section judgment unit configured to judge, for each unit section of the audio signal, whether the unit section is a feature unit section including a variation point of the features of the audio signal, based on a result of comparison of a threshold value and the feature variation value of the unit section.

2. The audio processing device in claim 1, wherein
the feature variation calculation unit calculates the feature variation value using a degree of similarity between section feature data of the target section and section feature data of a unit section, other than the target section, which is close to the target section.

3. The audio processing device in claim 2, wherein
the threshold value is a first threshold value,
the feature variation calculation unit calculates the feature variation value using a degree of similarity between the section feature data of the target section and section feature data of a unit section which is consecutive with the target section,
the section judgment unit judges, for each unit section of the audio signal, whether the unit section is a feature unit section candidate, based on the result of comparison of the first threshold value and the feature variation value of the unit section, and
the section judgment unit judges whether the feature unit section candidate is the feature unit section, based on a result of comparison of a second threshold value and a rate of change of the feature variation value of the feature unit section candidate.

4. The audio processing device in claim 1, wherein
the section feature data is a vector which accentuates magnitude of each component of a vector expressing the features of the audio signal in the unit section.

5. The audio processing device in claim 1, further comprising
a representative feature data storage unit that stores therein in advance, representative feature data which is used as a reference when judging, for each unit section of the audio signal, whether the unit section is the feature unit section, wherein
the section judgment unit includes a candidate judgment sub-unit configured to judge, for each unit section of the audio signal, whether the unit section is a feature unit section candidate, based on the result of comparison of the threshold value and the feature variation value of the unit section, and
the section judgment unit judges the feature unit section candidate to be the feature unit section when section feature data of a unit section close to the feature unit section candidate is similar to the representative feature data.

6. The audio processing device in claim 5, wherein
the section judgment unit judges the feature unit section candidate to be the feature unit section when section feature data of a unit section before the feature unit section candidate or section feature data of a unit section after the feature unit section candidate is similar to the representative feature data.

7. The audio processing device in claim 5, further comprising:
a user information acquisition unit configured to acquire an evaluation of the feature unit section by a user; and
a representative feature update unit configured to, based on the evaluation by the user, calculate new representative feature data using the section feature data of the unit section close to the feature unit section, and store the new representative feature data in the representative feature data storage unit.

8. The audio processing device in claim 1, further comprising
an acquisition unit configured to acquire external information which is used as a reference when judging, for each unit section of the audio signal, whether the unit section is the feature unit section, wherein
the section judgment unit includes a candidate judgment sub-unit configured to judge, for each unit section of the audio signal, whether the unit section is a feature unit section candidate, based on the result of comparison of the threshold value and the feature variation value of the unit section, and
the section judgment unit judges whether the feature unit section candidate is the feature unit section based on the external information.

9. The audio processing device in claim 8, wherein
the external information is face clustering information usable for judging a section in which an identified person appears in an AV content corresponding to the audio signal, and
the section judgment unit judges the feature unit section candidate to be the feature unit section when judging, based on the face clustering information, that the feature unit section candidate corresponds to the section in which the identified person appears in the AV content.

10. The audio processing device in claim 1, further comprising:
a reference feature data calculation unit configured to calculate reference feature data using section feature data of a plurality of unit sections included in a reference section, which consists of a predetermined number of consecutive unit sections which are close to the feature unit section; and
an interesting section extraction unit configured to extract as an interesting section, a plurality of consecutive unit sections which are close to the feature unit section and which each have section feature data similar to the reference feature data.

11. The audio processing device in claim 10, wherein
the reference section includes the feature unit section, and
the interesting section extracted by the interesting section extraction unit includes the reference section.

12. The audio processing device in claim 10, wherein
the reference section consists of a first reference section consisting of a predetermined number of consecutive unit sections directly before the feature unit section, and a second reference section consisting of a predetermined number of consecutive unit sections directly after the feature unit section,
the reference feature data calculation unit calculates as the reference feature data, first reference feature data of the first reference section and second reference feature data of the second reference section,
the interesting section extraction unit calculates:
a first interesting section, inclusive of the first reference section, consisting of a plurality of unit sections which each have section feature data similar to the first reference feature data; and
a second interesting section, inclusive of the second reference section, consisting of a plurality of unit sections which each have section feature data similar to the second reference feature data, and
the interesting section extraction unit extracts as the interesting section, a section from a start point of the first interesting section to an end point of the second interesting section.

13. The audio processing device in claim 10, wherein
the reference section consists of a first reference section consisting of a predetermined number of consecutive unit sections directly before the feature unit section, and a second reference section consisting of a predetermined number of consecutive unit sections directly after the feature unit section,
the reference feature data calculation unit calculates as the reference feature data, first reference feature data of the first reference section and second reference feature data of the second reference section, and
the interesting section extraction unit extracts as the interesting section:
a first interesting section, inclusive of the first reference section, consisting of a plurality of unit sections which each have section feature data similar to the first reference feature data; and
a second interesting section, inclusive of the second reference section, consisting of a plurality of unit sections which each have section feature data similar to the second reference feature data.

14. The audio processing device in claim 1, wherein
each unit section is a second unit section consisting of a plurality of first unit sections which are consecutive with one another,
the audio processing device further comprises:
a model storage unit that stores therein in advance, probability models expressing features of each of a plurality of sound pieces of various types; and
a likelihood vector generation unit configured to generate a likelihood vector for each first unit section using the probability models, the likelihood vector having as components, likelihoods of each sound piece with regards to the audio signal, and
the section feature data generated for each second unit section is a frequency vector which is generated using likelihood vectors of each first unit section included in the second unit section and which indicates appearance frequencies of the sound pieces.

15. The audio processing device in claim 14, further comprising
a feature vector generation unit configured to calculate for each first unit section, a feature vector which indicates a frequency characteristic of the audio signal, wherein
the likelihood vector generation unit generates the likelihood vector for the first unit section using the feature vector of the first unit section and the probability models.

16. The audio processing device in claim 1, further comprising a feature point extraction unit configured to extract as a feature point, a point in the feature unit section at which a ratio of time from an end point of the feature unit section relative to time from a start point of the feature unit section is equal to a ratio of, among the unit sections of which the section feature is used in calculation of the feature variation value of the feature unit section, a number of the unit sections before the feature unit section relative to a number of the unit sections after the feature unit section.

17. An audio processing method comprising:
a feature data generating step of generating, for each unit section of an audio signal, section feature data expressing features of the audio signal in the unit section;
a feature variation calculating step of calculating, for each unit section of the audio signal, a feature variation value which quantifies temporal variation of the features of the audio signal in the unit section, by setting the unit section as a target section and using section feature data of a plurality of unit sections close to the target section; and
a section judgment step of judging, for each unit section of the audio signal, whether the unit section is a feature unit section including a variation point of the features of the audio signal, based on a result of comparison of a threshold value and the feature variation value of the unit section.

18. A program which is recorded on a non-transitory computer readable recording medium and which causes a computer to execute audio processing, the audio processing comprising:
a feature data generating step of generating, for each unit section of an audio signal, section feature data expressing features of the audio signal in the unit section;
a feature variation calculating step of calculating, for each unit section of the audio signal, a feature variation value which quantifies temporal variation of the features of the audio signal in the unit section, by setting the unit section as a target section and using section feature data of a plurality of unit sections close to the target section; and
a section judgment step of judging, for each unit section of the audio signal, whether the unit section is a feature unit section including a variation point of the features of the audio signal, based on a result of comparison of a threshold value and the feature variation value of the unit section.

19. An integrated circuit comprising:
a feature data generation unit configured to generate, for each unit section of an audio signal, section feature data expressing features of the audio signal in the unit section;
a feature variation calculation unit configured to calculate, for each unit section of the audio signal, a feature variation value which quantifies temporal variation of the features of the audio signal in the unit section, by setting the unit section as a target section and using section feature data of a plurality of unit sections close to the target section; and
a section judgment unit configured to judge, for each unit section of the audio signal, whether the unit section is a feature unit section including a variation point of the features of the audio signal, based on a result of comparison of a threshold value and the feature variation value of the unit section.

* * * * *